United States Patent
Sundstrom et al.

(10) Patent No.: US 7,436,308 B2
(45) Date of Patent: *Oct. 14, 2008

(54) ADJUSTING RFID WAVEFORM SHAPE IN VIEW OF SIGNAL FROM ANOTHER READER

(75) Inventors: Kurt E. Sundstrom, Woodinville, WA (US); Christopher J. Diorio, Shoreline, WA (US); Todd E. Humes, Shoreline, WA (US); Paul Dietrich, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/412,192

(22) Filed: Apr. 25, 2006

(65) Prior Publication Data

US 2006/0261956 A1 Nov. 23, 2006

Related U.S. Application Data

(60) Provisional application No. 60/678,903, filed on May 4, 2005, provisional application No. 60/709,253, filed on Aug. 17, 2005, provisional application No. 60/715,917, filed on Sep. 9, 2005, provisional application No. 60/751,328, filed on Dec. 16, 2005.

(51) Int. Cl.
*G08B 13/14* (2006.01)
(52) U.S. Cl. .............. 340/572.4; 340/572.1; 340/572.4; 340/10.1; 340/10.3; 455/106; 455/108; 455/189.1
(58) Field of Classification Search .............. 340/572.4, 340/572.1, 10.1, 825.69, 568.1, 10.3; 331/175; 455/106, 108, 189.1; 702/107
See application file for complete search history.

(56) References Cited

U.S. PATENT DOCUMENTS

| 3,938,316 A | 2/1976 | Morokawa et al. |
| 4,454,483 A | 6/1984 | Baylor |
| 5,117,756 A | 6/1992 | Goffin, II |
| 5,438,694 A * | 8/1995 | Muri et al. ................. 455/341 |

(Continued)

FOREIGN PATENT DOCUMENTS

WO    WO02/065380    8/2002

(Continued)

OTHER PUBLICATIONS

"U.S. Appl. No. 10/824,049 Notice of allowance mailed Nov. 9, 2005", 5 pgs.

(Continued)

*Primary Examiner*—Jeff Hofsass
*Assistant Examiner*—Sisay Yacob
(74) *Attorney, Agent, or Firm*—Schwegman, Lundberg & Woessner, P.A.

(57) ABSTRACT

Systems, software, devices, and methods are described for an RFID reader system to communicate with RFID tags. RF energy encountered in conjunction with using a selected channel is detected. The RF energy can be a signal from another RFID reader. The detected signal is used to adjust a waveform shaping parameter. RF waves can be transmitted from the reader to the RFID tags and RF waves can be backscattered from the RFID tags. At least some of the RF waves transmitted to or backscattered from the RFID tags have a waveform with a shape according to the adjusted waveform shaping parameter.

71 Claims, 18 Drawing Sheets

U.S. PATENT DOCUMENTS

| | | | |
|---|---|---|---|
| 5,565,858 A | | 10/1996 | Guthrie |
| 5,583,819 A | | 12/1996 | Roesner et al. |
| 5,649,295 A | | 7/1997 | Shober et al. |
| 5,649,296 A | * | 7/1997 | MacLellan et al. ............ 455/39 |
| 5,686,902 A | * | 11/1997 | Reis et al. .................. 340/10.2 |
| 5,701,127 A | | 12/1997 | Sharpe |
| 5,751,220 A | | 5/1998 | Ghaffari |
| 5,867,535 A | | 2/1999 | Phillips et al. |
| 5,912,632 A | | 6/1999 | Dieska et al. |
| 5,940,006 A | | 8/1999 | MacLellan et al. |
| 5,952,922 A | | 9/1999 | Shober |
| 6,023,198 A | * | 2/2000 | McKinney et al. ............ 331/17 |
| 6,043,748 A | | 3/2000 | Touchton et al. |
| 6,046,683 A | | 4/2000 | Pidwerbetsky et al. |
| 6,064,320 A | | 5/2000 | d'Hont et al. |
| 6,127,928 A | | 10/2000 | Issacman et al. |
| 6,130,623 A | * | 10/2000 | MacLellan et al. ........... 340/5.1 |
| 6,243,013 B1 | | 6/2001 | Duan et al. |
| 6,259,991 B1 | | 7/2001 | Nysen |
| 6,356,161 B1 | | 3/2002 | Nolan et al. |
| 6,388,532 B1 | | 5/2002 | Babcock |
| 6,404,325 B1 | | 6/2002 | Heinrich et al. |
| 6,472,943 B1 | | 10/2002 | Soong et al. |
| 6,600,905 B2 | * | 7/2003 | Greeff et al. ................. 455/106 |
| 6,603,391 B1 | * | 8/2003 | Greeff et al. ............... 340/10.3 |
| 6,639,509 B1 | | 10/2003 | Martinez |
| 6,664,860 B2 | * | 12/2003 | Fallisgaard et al. ........... 331/18 |
| 6,784,789 B2 | | 8/2004 | Eroglu et al. |
| 6,917,291 B2 | | 7/2005 | Allen |
| 7,026,935 B2 | | 4/2006 | Diorio et al. |
| 7,091,828 B2 | * | 8/2006 | Greeff et al. ............... 340/10.3 |
| 7,120,550 B2 | * | 10/2006 | Diorio et al. ................. 702/107 |
| 7,253,719 B2 | * | 8/2007 | Diorio et al. ............... 340/10.4 |
| 7,283,037 B2 | * | 10/2007 | Diorio et al. ............. 340/10.51 |
| 7,304,579 B2 | * | 12/2007 | Diorio et al. ............. 340/572.4 |
| 2002/0167405 A1 | | 11/2002 | Shanks et al. |
| 2003/0174049 A1 | | 9/2003 | Beigel et al. |
| 2005/0099269 A1 | | 5/2005 | Diorio et al. |
| 2005/0099270 A1 | | 5/2005 | Diorio et al. |
| 2006/0261952 A1 | | 11/2006 | Kavounas et al. |
| 2006/0261953 A1 | | 11/2006 | Diorio et al. |
| 2006/0261954 A1 | | 11/2006 | Dietrich et al. |
| 2006/0261955 A1 | | 11/2006 | Humes et al. |

FOREIGN PATENT DOCUMENTS

| | | |
|---|---|---|
| WO | WO-2005048312 A2 | 5/2005 |
| WO | WO-2005048612 A1 | 5/2005 |

OTHER PUBLICATIONS

"U.S. Appl. No. 10/824,049, Preliminary Amendment filed Jun. 23, 2005", 6 pgs.

"U.S. Appl. No. 10/824,049, Preliminary Amendment filed Jul. 13, 2004", 2 pgs.

"U.S. Appl. No. 10/824,049, Preliminary Amendment filed Oct. 11, 2005", 11 pgs.

"U.S. Appl. No. 10/824,049, Supplemental Notice of Allowability mailed Feb. 3, 2006", 3 pgs.

"U.S. Appl. No. 10/985,518, Final Office Action mailed Mar. 2, 2007", 6 pgs.

"U.S. Appl. No. 10/985,518, Non-Final Office Action mailed Jun. 28, 2006", 13 pgs.

"U.S. Appl. No. 10/985,518, Notice of Allowance mailed Jun. 5, 2007", 4 pgs.

"U.S. Appl. No. 10/985,518, Preliminary Amendment filed Jun. 23, 2005", 6 pgs.

"U.S. Appl. No. 10/985,518, Response filed May 2, 2007 to Final Office Action Mar. 2, 2007", 5 pgs.

"U.S. Appl. No. 10/985,518, Reponse filed Sep. 28, 2006 to Non-Final Office Action mailed Jun. 28, 2006", 9 pgs.

"U.S. Appl. No. 11/411,657, Preliminary Amendment filed Aug. 28, 2006", 3 pgs.

"U.S. Appl. No. 11/411,657, Preliminary Amendment filed Oct. 29, 2007", 5 pgs.

"U.S. Appl. No. 11/412,170, Preliminary Amendment filed Aug. 28, 2006", 3 pgs.

"U.S. Appl. No. 11/412,170, Preliminary Amendment filed Oct. 29, 2007", 5 pgs.

"U.S. Appl. No. 11/412,171, Preliminary Amendment filed Aug. 28, 2006", 3 pgs.

"U.S. Appl. No. 11/412,171, Preliminary Amendment filed Oct. 29, 2007", 5 pgs.

"U.S. Appl. No. 11/412,172, Preliminary Amendment filed Aug. 28, 2006", 3 pgs.

"U.S. Appl. No. 11/412,172, Preliminary Amendment filed Oct. 29, 2007", 5 pgs.

"International Search Report, for Application No. PCT/US04/37387, date mailed Mar. 24, 2005", 18 Pages.

"Part 1 Technical requirements and methods of measurements [Electromagnetic compatibility and radio spectrum Matters (ERM); Radio Frequency Identification Equipment operating in the band 865 MHz to 868 MHz with power levels up to 2 W]", *ETSI EN 302 208-1 V1.1.1* (Sep. 2004), 1-52.

"Part 2 Harmonized EN under article 3.2 [Electromagnetic compatibility and radio spectrum Matters (ERM); Radio Frequency Identification Equipment operating in the band 865 MHz to 868 MHz with power levels up to 2 W]", *ETSI EN 302 208-2 V1-1.1*, (Sep. 2004), 1-17.

Finkenzeller, Klaus , "Fundamental Operating Principles", *RFID Handbook; Fundamentals and Applications in Contactless Smart Cards and Identification*, John Wiley & Sons, Ltd ; ISBN 0-470-84402-7,(2003),29-59.

EPCglobal, Inc. "Specification for RFID Air Interface-EPC Radio-Frequency Identity Protocols Class-1 Generation-2 UHF RFID Protocol for Communications at 860 MHz-960 MHz, Version 1.1.0." (a.k.a "The Gen 2 Spec".) EPCglobal Inc., Dec. 17, 2005. <http://www.epcglobalinc.org>.

EPCglobal Inc. "Specification for RFID Air Interface-EPC Radio-Frequency Identity Protocols Class-1 Generation-2 UHF RFID Protocol for Communications at 860 MHz-960 MHz, Version 1.0.8." EPCglobal Inc., Dec. 14, 2004. <http://www.epcglobalinc.org>.

Declaration of Stacy L. Jones authenticating attached Website Materials as accessed and posted at http://www.autoid.org/SC31/sc_31_wg4_sg3.htm on Sep. 1, 2006.

"U.S. Appl. No. 11/411,657 Notice of Allowance mailed Mar. 25, 2008", NOAR, 17 pgs.

"U.S. Appl. No. 11/412,172, Notice of Allowance mailed Feb. 28, 2008", NOAR, 14 pgs.

"U.S. Appl. No. 11/412,172 Supplemental Notice of Allowability mailed Apr. 17, 2008", SNOA, 4pgs.

* cited by examiner

*RFID SYSTEM*

*RFID TAG*

*RFID READER SYSTEM CONFIGURATION WITH OPTIONAL LOCAL AND REMOTE COMPONENTS*

ADJUSTING RFID WAVEFORM SHAPE IN VIEW OF SIGNAL FROM ANOTHER READER

CLAIMS OF PRIORITY

This application claims the benefit under 35 U.S.C. § 119 (e) of U.S. Provisional Application Ser. No. 60/678,903 filed May 4, 2005 entitled "RECORDING USAGE DATA ABOUT RFID CHANNELS".

This application claims the benefit under 35 U.S.C. § 119 (e) of U.S. Provisional Application Ser. No. 60/709,253 filed Aug. 17, 2005 entitled "PREVENTING COMMUNICATION CONFLICT AMONG RFID READERS".

This application claims the benefit under 35 U.S.C. § 119 (e) of U.S. Provisional Application Ser. No. 60/715,917 filed Sep. 9, 2005 entitled "RFID READER SYSTEM CHANGING MODES IN RESPONSE TO DETECTING POSSIBLE TAG READ ERRORS".

This application claims the benefit under 35 U.S.C. § 119 (e) of U.S. Provisional Application Ser. No. 60/751,328 filed Dec. 16, 2005 entitled "RECORDING USAGE DATA ABOUT RFID CHANNELS".

The entire content of each of the above applications is incorporated herein by reference.

CROSS REFERENCE TO RELATED APPLICATIONS

This application may be associated with U.S. application Ser. No. 10/824,049 filed on Apr. 13, 2004, entitled "METHOD AND APPARATUS TO CONFIGURE AN RFID SYSTEM TO BE ADAPTABLE TO A PLURALITY OF ENVIRONMENTAL CONDITIONS".

This application may be associated with U.S. application Ser. No. 10/985,518 filed on Nov. 10, 2004, entitled "RFID TAGS ADJUSTING TO DIFFERENT REGULATORY ENVIRONMENTS, AND RFID READERS TO SO ADJUST THEM AND METHODS".

This application may be associated with U.S. application Ser. No. 11/195,468 filed on Aug. 1, 2005, entitled "PREVENTING COMMUNICATION CONFLICT WITH OTHER RFID READERS".

This application may be associated with U.S. application Ser. No. 11/388,235 filed on Mar. 26, 2006, entitled "ERROR RECOVERY IN RFID READER SYSTEMS".

FIELD

The present disclosure relates to Radio Frequency IDentification (RFID) systems, and more particularly, to apparatus, methods, software, and systems to improve the performance of RFID systems, for example responsive to the presence of RF energy in communication channels.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A reader algorithm has been described in the prior art, whereby an RFID reader chooses a channel, and then first listens to see if another radio-frequency device is operating in it ("listen-before-talk"). If no other radio-frequency device is operating there, the reader operates in that channel. If another radio-frequency device is operating in the channel, the reader moves to a different channel, and again listens, and so on. While this type of algorithm may sometimes be useful in locating an available channel for communication, improvements are needed for RFID operation in the presence of interference and/or noise.

DETAILED DESCRIPTION

Figure 1:
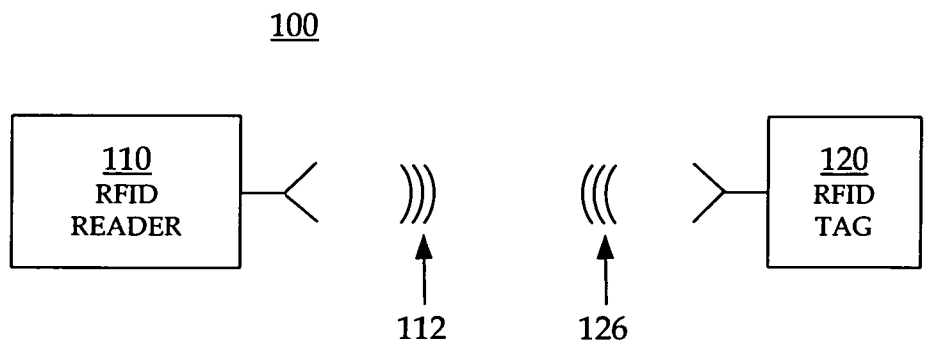
FIG. 1 is a block diagram of components of an RFID system.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired.

Tag 120 can be a passive tag or an active tag, i.e. having its own power source. Where tag 120 is a passive tag, it is powered from wave 112.

Figure 2:
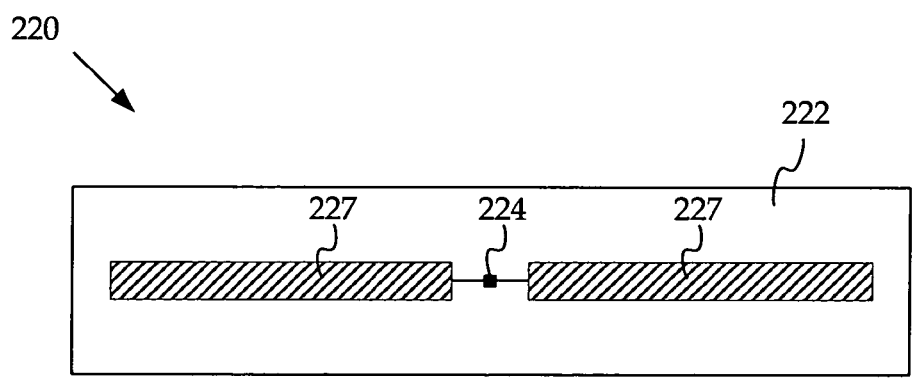
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
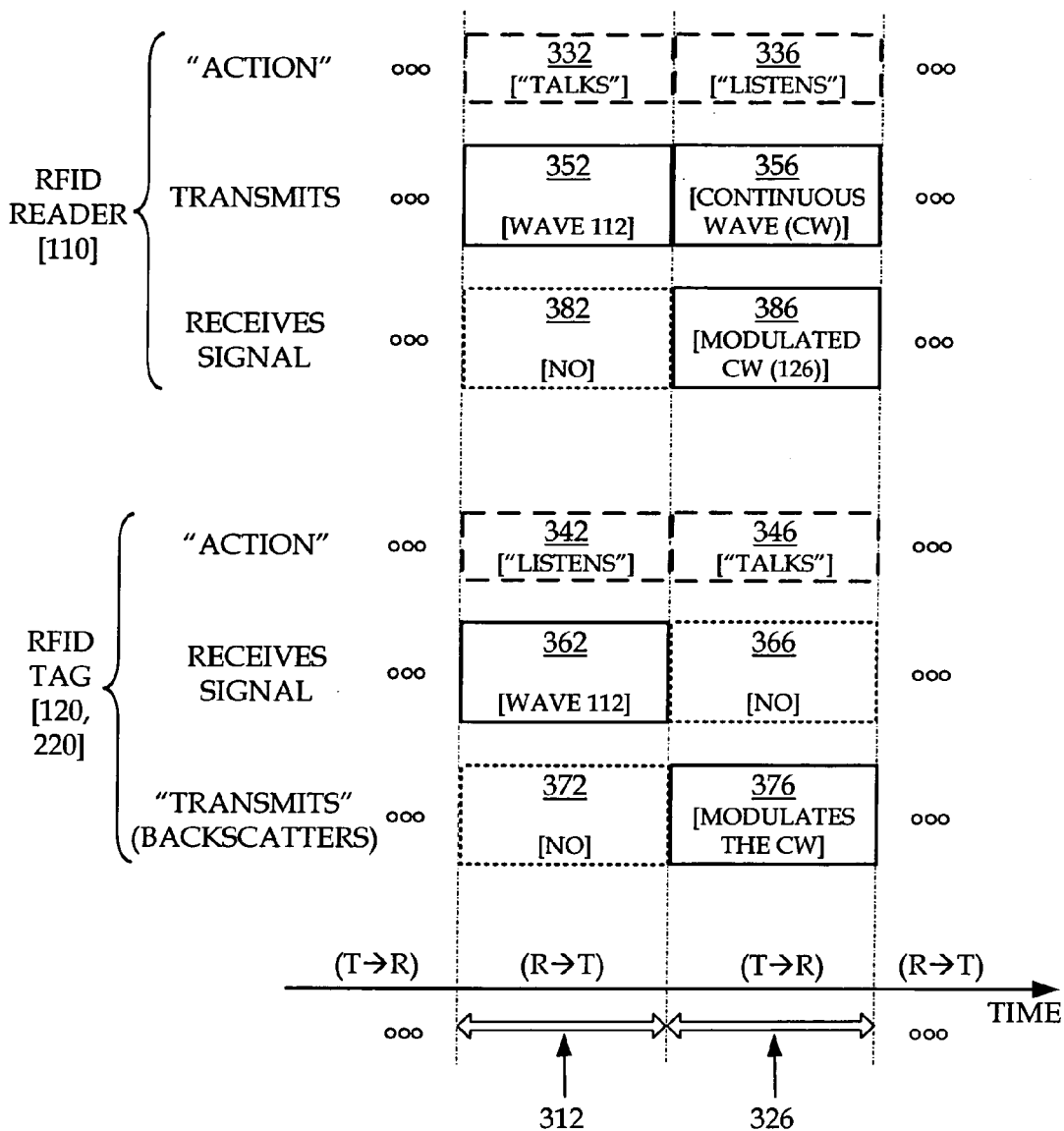
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface-EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitter CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel, it may encounter RF energy that could interfere with communications in it.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
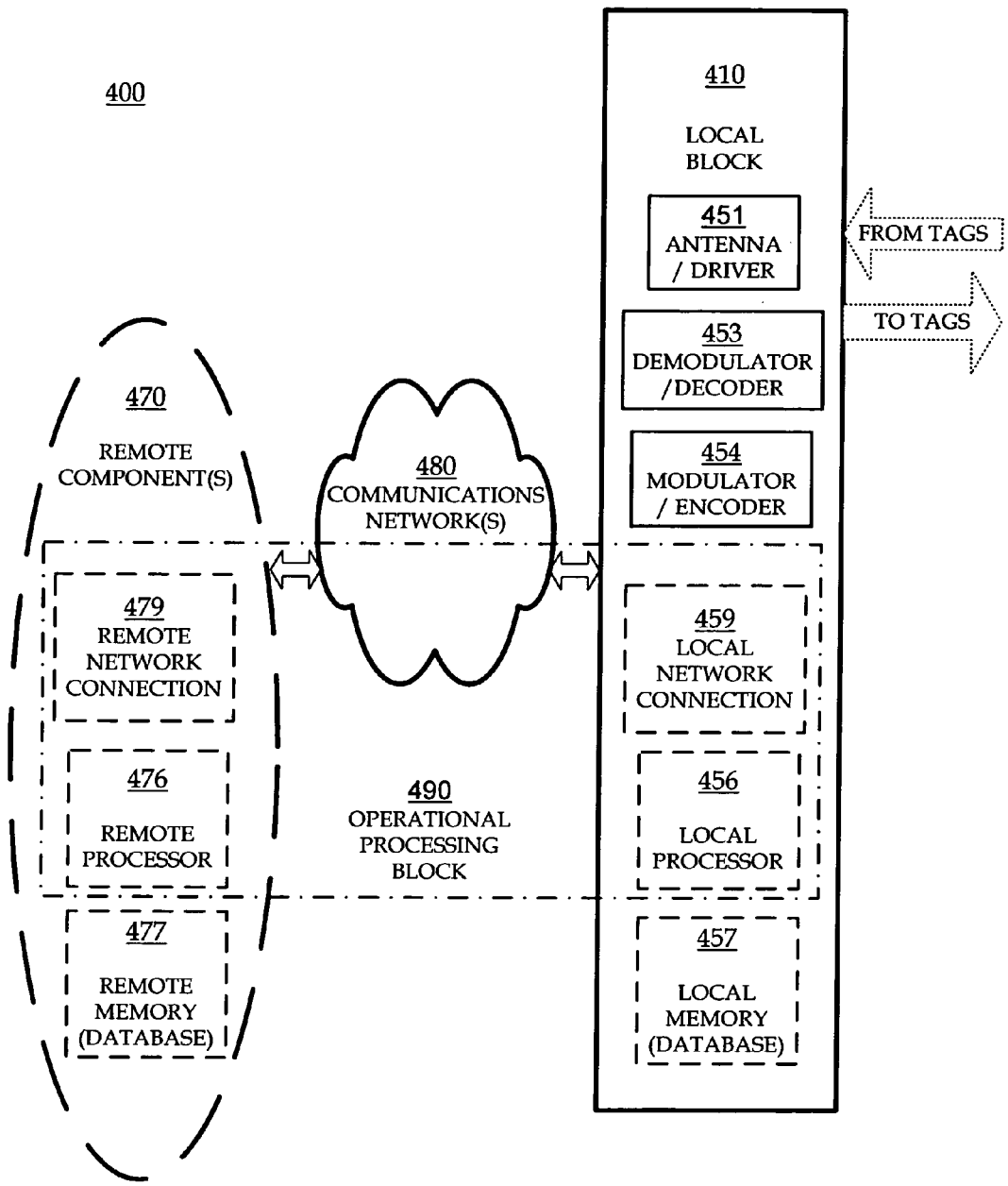
FIG. 4 is a block diagram of a whole RFID reader system according to embodiments.

FIG. 4 is a block diagram of a whole RFID reader system 400 according to embodiments. System 400 includes a local block 410, and optionally remote components 470. Local block 410 and remote components 470 can be implemented in any number of ways. It will be recognized that reader 110 of FIG. 1 is the same as local block 410, if remote components 470 are not provided. Alternately, reader 110 can be implemented instead by system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna block 451. Modulator/encoder block 454 encodes and modulates an RF wave that is to be transmitted to the tags via antenna block 451.

Local block 410 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), and any combination of one or more of these; and so on. In some cases the decoding function in block 453, the encoding function in block 454, or both may be performed instead by processor 456.

Local block 410 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. Memory 457, if provided, can include programs for processor 456 to run, if provided.

In some embodiments, memory 457 stores data read from tags, or data to be written to tags, such as Electronic Product Codes (EPCs), Tag Identifiers (TIDs) and other data. Memory 457 can also include reference data that is to be compared to the EPC codes, instructions and/or rules for how to encode commands for the tags, modes for controlling antenna 451, and so on. In some of these embodiments, local memory 457 is provided as a database.

Some components of local block 410 typically treat the data as analog, such as the antenna/driver block 451. Other components such as memory 457 typically treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, and so on. In turn, local block 410 then includes a local network connection 459 for communicating with network 480.

There can be one or more remote component(s) 470. If more than one, they can be located at the same place with each other, or in different places. They can access each other and local block 410 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs.

Of the above-described elements, it is advantageous to consider operational processing block 490. Block 490 includes those that are provided of the following: local processor 456, remote processor 476, local network connection 459, remote network connection 479, and by extension an applicable portion of network 480 that links connection 459 with connection 479. The portion can be dynamically changeable, etc. In addition, block 490 can decode RF waves received via antenna 451, and cause antenna 451 to transmit RF waves according to what it has processed. It can even be said that block 490 can receive RF waves, in which case it is meant that block 490 can receive data about the waves, and so on.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477, if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Block 490, along with all of the circuits described in this document may be implemented as circuits in the traditional sense. All or some of them can also be implemented equivalently by other ways known in the art, such as by using one or more processors, DSPs, FPGAs, FPAAs, PLDs, combination of hardware and software, etc.

Reader system 400 operates by block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing block 490.

Embodiments of the disclosure provide an RFID reader that is capable of the methods described below. In some embodiments software is provided for controlling an RFID reader that operates as per the described methods. The software is not limed to physical locations and can be implemented as a standalone module or as a collection of cooperating distributed modules. The described embodiments may be performed in many ways, including by devices that can perform the described methods. Such devices can be implemented in many ways, as will be obvious to a person skilled in the art in view of the present description.

The operations of this description, such as those of block 490, may be implemented by one or more devices that include logic circuitry. The device(s) perform functions and/or implement methods as described in this document. The device(s) may include a processor that may be programmable for a general purpose, and/or may include a dedicated element or elements such as a microcontroller, microprocessor, DSP, etc. For example, the device(s) may be a digital-computer-like element, such as a general-purpose computer selectively activated or reconfigured by a computer program stored in the computer or in its memory. Alternately, the device may be implemented by an FPGA, FPAA, PLD, Application Specific Integrated Circuit (ASIC), etc.

Moreover, methods are described below. The methods and algorithms presented herein need not be associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between methods provided in this description, and methods of operating a computing machine. This description relates both to methods in general, and also to methods for operating a computing machine for processing electrical or other such physical signals to generate other desired physical signals.

Programs are additionally included in this description, as are methods of operation of the programs. A program is generally defined as a group of steps leading to a desired result, due to the nature of the elements in the steps and their sequence. A program is usually advantageously implemented as a sequence of steps for a computing machine, such as a general-purpose computer, a special-purpose computer, a microprocessor, etc.

Storage media are additionally included in this description. Such media, individually or in combination with others, have stored thereon instructions of a program made according to the invention. A storage medium according to the invention is a computer-readable medium, such as a memory, and is read by the computing machine mentioned above.

Performing the steps or instructions of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is desirable to implement and describe a program as various interconnected distinct software modules or features, individually and collectively also known as software. This is not necessary, however, and there may be cases where modules are equivalently aggregated into a single program with unclear boundaries. Furthermore, one or more modules may be advantageously implemented in a logic device such as an FPGA, FPAA, PLD, ASIC, and the like. In any event, the modules or features of this description may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

It will be appreciated that some of these methods may include software steps which may be performed by different modules of an overall part of a software architecture. For example, wave shaping in a reader may be performed in a data plane, which consults a local wave-shaping table. Collecting performance data may also be performed in a data plane. The performance data may be processed in a control plane, which accordingly may update the local wave-shaping table, in addition to neighboring ones. A person skilled in the art will discern which step is best performed in which plane.

An economy is achieved in the present document in that a single set of flowcharts is used to describe both programs and methods. So, while flowcharts are described in terms of boxes, they can mean both programs and methods.

For this description, the methods may be implemented by machine operations. In other words, embodiments of programs, which may be implemented by machine operations, are made such that they perform methods of the invention described in this document. These machine operations may be optionally performed in conjunction with one or more human operators performing some, but not all of them. As per the above, the human operators need not be collocated with each other, but each only with a machine that performs a portion of the program. Alternately, some of these machines may operate automatically, without human operators and/or independently from each other.

Figure 5:
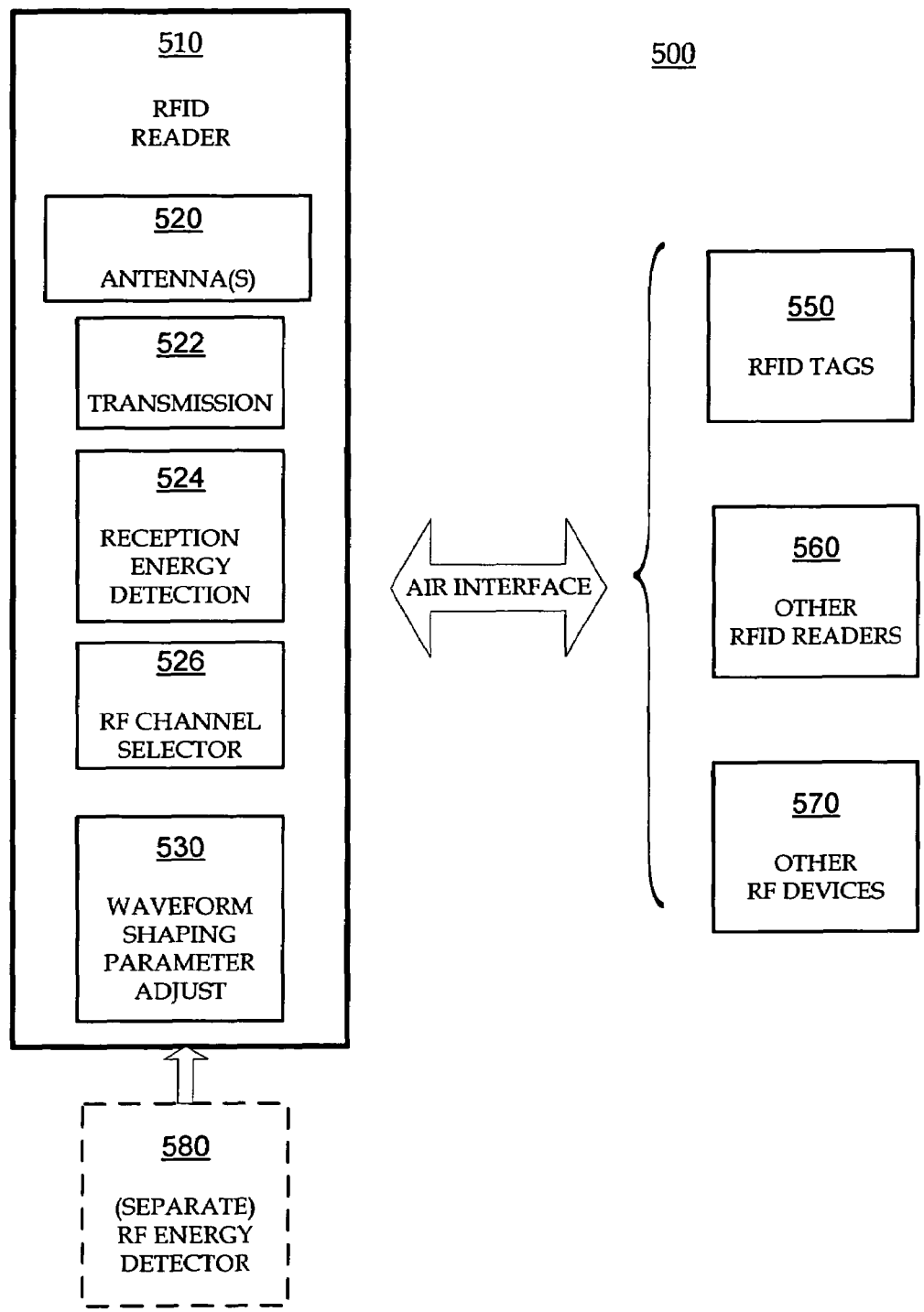
FIG. 5 is a block diagram of components of an RFID environment according to present embodiments.

FIG. 5 is a block diagram of an RFID system and representative operating environment. An RFID reader 510 includes antenna(s) 520 for transmission and reception of RFID signals, as described above. A transmission module 522 is provided to transmit signals from the reader via antenna(s) 520.

RFID reader 510 also includes a reception/energy detection module 524. Module 524 can receive signals and detect energy encountered in conjunction with the received signals. The operations of reception/energy detection can be performed at Radio Frequencies (RF), after frequency downconversion, or after frequency upconversion (collectively "frequency conversion").

RFID reader 510 moreover includes an RF channel selector module 526, provided with antenna(s) 520 to select a channel for operation, i.e. for transmitting and/or receiving signals.

RFID reader 510 additionally includes a waveform shaping parameter adjust module 530, as explained in more detail in this document. Module 530 can adjust one or more waveform shaping parameters of either or both the signals transmitted by reader 510, and the backscattered signals received from, RFID tags 550. Examples of waveform shaping parameters are given later in this document.

It will be appreciated that one or more of modules 524, 526 and 530 can be implemented by one or more elements of operational processing block 490, typically but not necessarily in conjunction with demodulator/decoder 453 and modulator/encoder 454.

A separate energy detector module 580 can optionally be provided to detect RF energy present in the operating environment of the reader 510. Module 580 can be a standalone module or can be implemented by remote processor 476. Module 580 can detect signals or energy at RF, after frequency conversion, or both. In operation, module 580 alone, or reception/energy detection module 524 alone, or a combination of both modules, detect RF energy or signals present in the operating environment of a reader or readers. Module 580 can monitor the operating environment for use by one reader, or for use by multiple readers. Multiple energy detection modules 580 can be dedicated to multiple channels, operating concurrently. Or a single energy detection module 580 can listen to channels one at a time, e.g. in rotation. Further, a module 580 can listen to a combination of channels, e.g. all at once, and infer about each particular one. The energy detection modules 524 and 580 can monitor the operating environment continuously, or at predetermined intervals, or when certain trigger events happen, such as but not limited to when reader performance degrades relative to a threshold, when told to, etc.

It will be understood that the term Signal refers to the desired communication signals between a reader and tag(s). Noise means undesired and indecipherable RF energy such as thermal noise, shot noise, and other noise-like energy. Interference means signals from other RF devices and from other non-RF devices that happen to be emitting RF energy, even in communicating with each other. A Signal-to-Noise Ratio (SNR) is defined as the power in the signal divided by the power in the noise. A Signal-to-Noise-and-Interference Ratio (SINR) is defined as the power in the signal divided by the powers in the noise plus the power in the interference.

The RF energy that is detected can originate from a plethora of different sources, including but not limited to other RFID readers 560 and other RF devices 570, across the air interface. The energy can include modulated signals, unmodulated signals, decodable signals, undecodable signals, RF noise, interference, or a mixture thereof. The other RF devices can include devices used in industry, such as motors, that are not intended to operate as RF devices but create RF interference or noise.

As referred to later in this document, detecting RF energy can be detecting signal, detecting noise, detecting interference, detecting signal and/or noise and/or interference, receiving information about the signal and/or noise and/or interference, or inferring the signal and/or noise and/or interference from operational performance parameters such as tag read rate. The RF energy may be detected as an average power, as a peak power, as an integrated power, as a power spectral density (PSD) (for example, a Fast Fourier Transform (FFT) effectively computes a PSD), etc.

As stated above, the waveform shaping parameter module 530 adjusts waveform shaping parameters based upon energy encountered in the operational RF environment of the reader 510. Embodiments are now described, of the type of energy, waveform shaping options, and processing techniques.

Figure 6A:
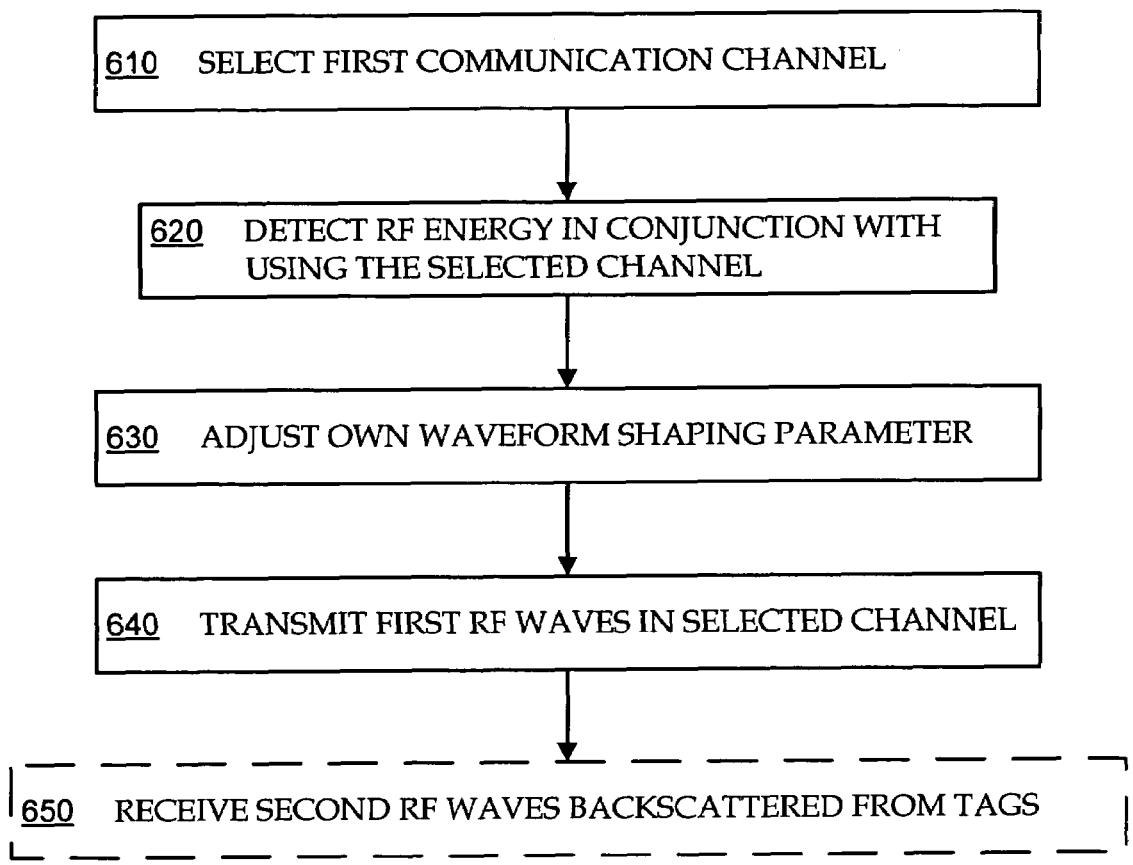
FIG. 6A is a flowchart illustrating a method according to present embodiments.

FIG. 6A is a flowchart 600 illustrating methods for reader systems of the present disclosure, such as to communicate with RFID tags. The individual operations of the methods of flowchart 600 can be implemented in many different ways, as will be understood by a person skilled in the art. In addition, they can be implemented by the physical components described earlier in this document.

According to an operation 610, a first channel is selected out of a number of them in a spectrum. This selection can be performed for example by RF channel selector 526. The selection can be associated with parameters or flags being set in software, or switches moving in hardware, and the like. These may adjust the antenna to operate at a certain channel.

According to another operation 620, RF energy is detected. As stated above, the energy can be detected using energy detector module 580 or energy detection module 524, or a combination of the two modules. Equivalently, instead of energy being detected, an input is received conveying a value for the detected energy.

In some embodiments, the RF energy is detected prior to selecting the first communication channel at operation 610. It can even be detected prior to subdividing the available frequency spectrum into channels in the first place. This subdivision, also known as channelization, can take place in response to the RF energy detected in the spectrum. For example, the channel width can depend on the amount of ambient noise, etc. Even after channelization, the RF energy can be detected in a plurality of channels simultaneously, in individual channels sequentially, or any combination thereof, and the first channel can be selected from the plurality of channels responsive to the detection and possibly measurement.

In some embodiments, the energy in operation 620 is detected after channelization, and thus after the first channel has been defined, and after the first channel has been selected per operation 610. In some of those, the detected energy in operation 620 is of the type typically encountered in conjunction with using the selected first channel. For example, it can be the RF energy presently in the selected first channel. In some of these embodiments, the RF energy can include energy in any other related channels, such as in adjacent channels, where tags could be backscattering, responding to a reader's signal in the first channel. Accordingly, the detected RF energy can include noise, signals that are decodable, interference from any source in the environment, etc. In some embodiments, it can also include energy resulting from the reader system's own operation, such as reflected by fluorescent light sources, etc.

In some embodiments, a level of the detected RF energy is measured, to yield a value. The value can have units, such as dB. Or the value can have units assigned based on possible ranges of the value, such as low/medium/high, or low/high, digital values such as 0/1, and so on. If the detected RF energy includes noise, the units can be values such as "quiet"/"noisy", etc.

In some embodiments, the detected RF energy includes a signal, which is further demodulated and/or decoded prior to measurement. More examples will be presented later in this document.

According to operation 630, a waveform shaping parameter is adjusted responsive to the detected RF energy. This waveform shaping parameter is also called the own waveform shaping parameter, in that it is a parameter of a system, device, software, or method according to embodiments, as distinguished from other waveform shaping parameters that can be determined, for example by detecting, decoding and interpreting signals from other readers or tags. A great value, therefore, of the invention is where operation must be in an environment where other readers already operate. Such scenarios were explained in more detail in copending U.S. application Ser. No. 11/195,468 filed on Aug. 1, 2005, entitled "PREVENTING COMMUNICATION CONFLICT WITH OTHER RFID READERS".

Adjusting the own waveform shaping parameter can be performed in a number of ways, some of which are described below. Most of these ways involve decisions and settings within software and hardware respectively, such as setting flags and configuring circuits to operate in certain ways, and so on. In quite a number of these embodiments, features of the detected RF energy are identified, values for these features are determined, etc., and the own waveform shaping parameter is adjusted in view of these features, values, etc. These features can include the level of the detected RF energy, and others as will be especially evident from the below. Optionally, additional own waveform shaping parameters can further be adjusted, and so on.

According to operation 640, first RF waves are transmitted to the RFID tags in the selected channel, which can be the first channel or another channel selected in the meantime instead of the first channel.

According to an optional operation 650, second RF waves are received, which are backscattered from the RFID tags in response to the transmitted first RF waves. The second RF waves can be within the same channel, or other nearby channels.

Either the first RF waves of operation 640, or the second RF waves of operation 650, or both, have a waveform with a shape according to the adjusted waveform shaping parameter(s).

Here the designations "first" and "second", and later "third" and "fourth" are given for convenience, and do not, by themselves alone, imply a chronological order. Such an order can, however, be inferred from causation, for example when second waves are backscattered responsive to first waves, etc.

In other embodiments, the above described operations can be performed in combination with other operations, or in different order.

For example, operation 640 typically takes place after operation 620, although that is not necessary. Other orders are also possible.

For another example, third RF waves can be transmitted to the RFID tags prior to adjusting the waveform shaping parameter, either in the selected channel or otherwise, and even before the first waves. The RF energy can be detected before or after transmitting the third waves.

Even more, fourth waves may be received from the tags in response to the third waves, and even before the first waves. The RF energy can be detected before or after receiving the fourth waves.

Figure 6B:
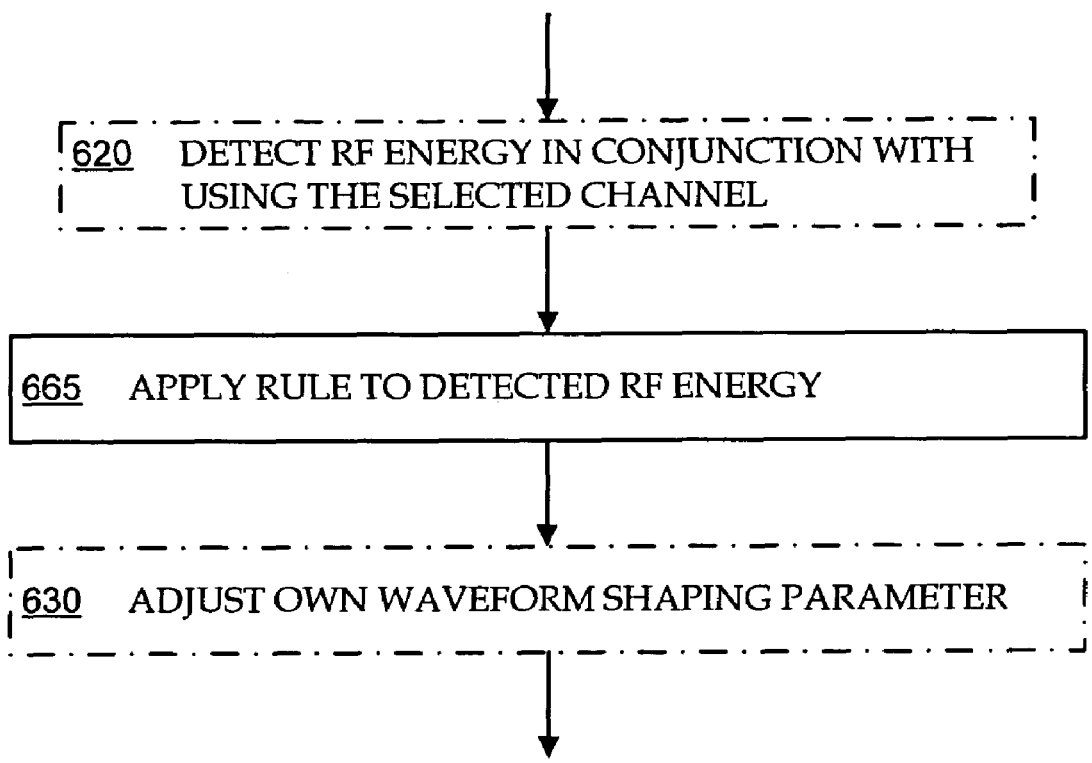
FIG. 6B is a flowchart illustrating an optional variation of the method of FIG. 6A.

FIG. 6B illustrates a flowchart 660 of embodiments of flowchart 600, for methods to apply a rule to the detected RF energy. Operations 620 and 630 are shown again, from flowchart 600.

In addition, according to operation 665, a rule is applied to the detected RF energy. The rule can be applied by implementing a table, a formula, an algorithm, etc. Further, the rule can be updated during operation, for example by updating either the whole rule, or merely parameters of it such as table entries, formula coefficients, and the like.

A result is determined from applying the rule. The waveform shaping parameter can therefore be adjusted according to the result.

Figure 6C:
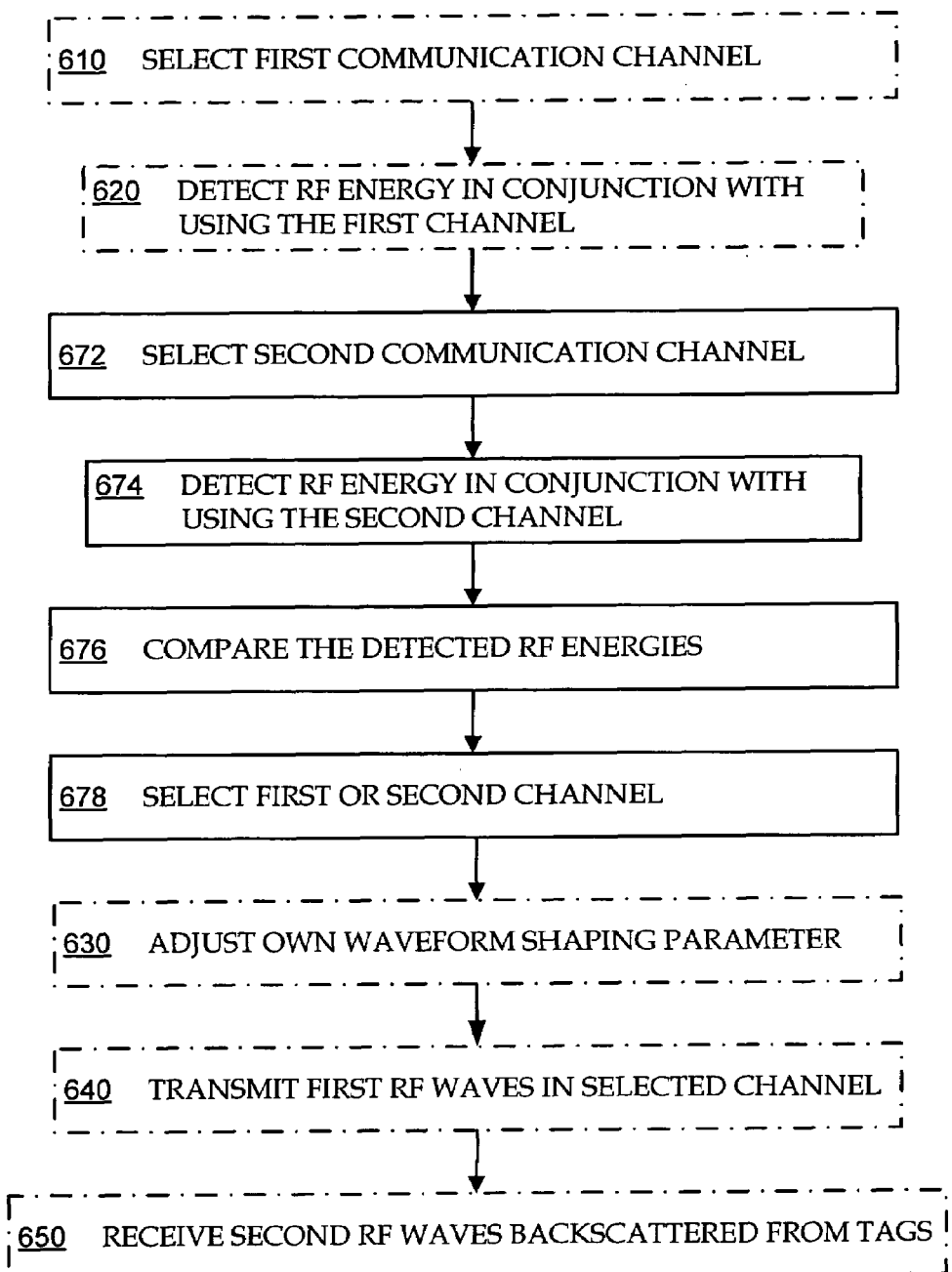
FIG. 6C is a flowchart illustrating another optional variation of the method of FIG. 6A.

FIG. 6C illustrates a flowchart 670 of embodiments with further extensions of the method with flowchart 600. Flowchart 670 includes operations 610, 620, 630, 640 and 650 of flowchart 600.

According to an additional operation 672, a second communication channel is selected, after the first channel has been selected in operation 610. In some embodiments, operation 672 takes place before any transmission has occurred, such as at operation 640. In other embodiments, operation 672 takes place after such transmission has occurred.

According to a next operation 674, RF energy is detected, such as of the type encountered in conjunction with using the second channel, which is now selected.

According to a next operation 676, the detected RF energies are compared. If, as is preferred, values have been assigned, then the values are compared.

According to a next operation 678, the first or the second channel is selected, depending on the comparison of operation 676. Preferably, the selection is made so that the impending transmission in the selected channel and reception would be the most likely to succeed. Metrics can be used, so that the impending transmission will have the best SNR or SINR.

Then operation 630 takes place as explained above, and also in view of the comparison of operation 676 and/or the selection of operation 678.

Then operations 640 and 650 take place as explained above. The selected channel of operation 640 could now be the second channel instead of the first channel.

Waveform shaping parameters are now described in more detail.

Such parameters represent how the waveform of RF waves is shaped, whether it is a reader-to-tag (R→T) transmission, or for tag-to-reader (T→R) backscattered transmission. Indeed, the waveform can be shaped every time any information is encoded in it. An example can be seen by briefly consulting FIG. 7 and FIG. 9, where a waveform has a substantially constant nominal maximum amplitude, and information is encoded by low-going pulses from that amplitude than a nominal maximum amplitude. The nominal maximum amplitude can further be taken as a continuous wave, and can be set or changed according to yet other considerations.

These waveform shaping parameters are settable. It will be appreciated that those parameters are set by the reader; in other words, readers control in part how the tags are to behave.

Settable parameters are now described in more detail.

Some of these waveform shaping parameters control a choice of a protocol of communication, for the RFID reader and the RFID tag. For example, when a tag is capable of communicating in two or more different protocols, the waveform shaping parameter can dictate the encoding of the reader wave, so that the receiving tag will understand which protocol is designated.

One settable parameter is the reader's allowed operating frequency or frequencies, which are typically required to be within a frequency range dictated by regulatory rules.

Another settable parameter is frequency diversity. As one example of frequency diversity, RFID readers may choose to, or may be required to, 'hop' at regular intervals among multiple frequencies in the allowed range. Such readers are often called "frequency hopping" readers. An example of readers that do not use frequency diversity is readers that transmit at a chosen frequency in the allowed range, typically not changing frequency unless there is a reason to do so.

Some of the waveform shaping parameters control a choice of a modulation format, i.e. the format by which readers transmit, or tags are to backscatter. Possibilities for the latter include double-sideband amplitude shift keying (DSB-ASK), single-sideband ASK (SSB-ASK), phase-reversal ASK (PR-ASK), and PSK (phase shift keying). Other modulation formats are possible as well.

Figure 7:
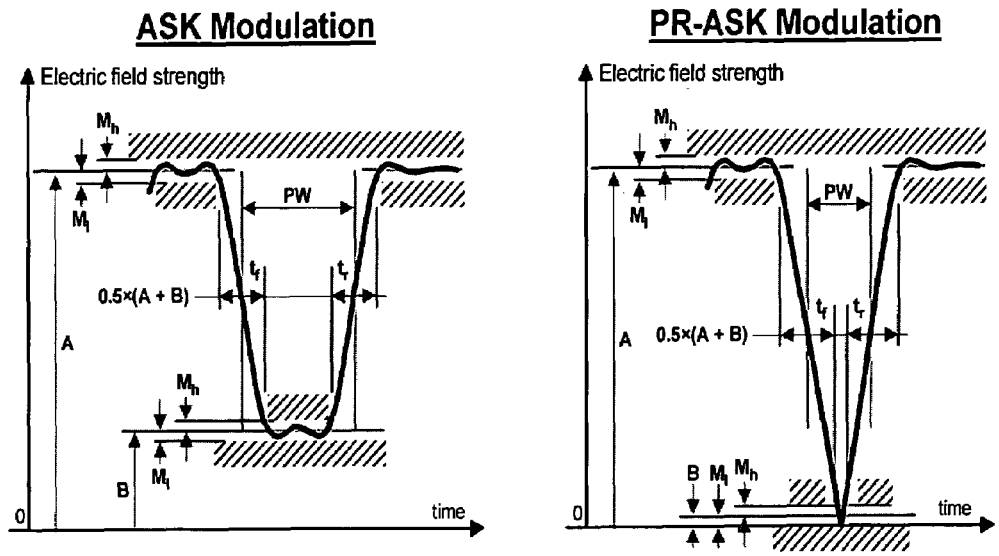
FIG. 7 illustrates examples of amplitude shift keying (ASK) modulation, and phase reversal amplitude shift keying (PR-ASK) modulation that can be used for RFID communication.

FIG. 7 illustrates two of the above mentioned modulation formats. One of them is a signal using ASK modulation, and the other is a signal using PR-ASK modulation. Other modulation formats are possible.

Yet other settable parameters relate to the RF spectrum used, and power level. For example, different transmission spectral masks allow for constraining different amounts of out-of-channel or out-of-band spectral energy. A reader may be constructed to meet one transmission spectral mask under some operating conditions, and another mask for different operating conditions. Two sample transmit spectral masks are shown.

Figure 8A:
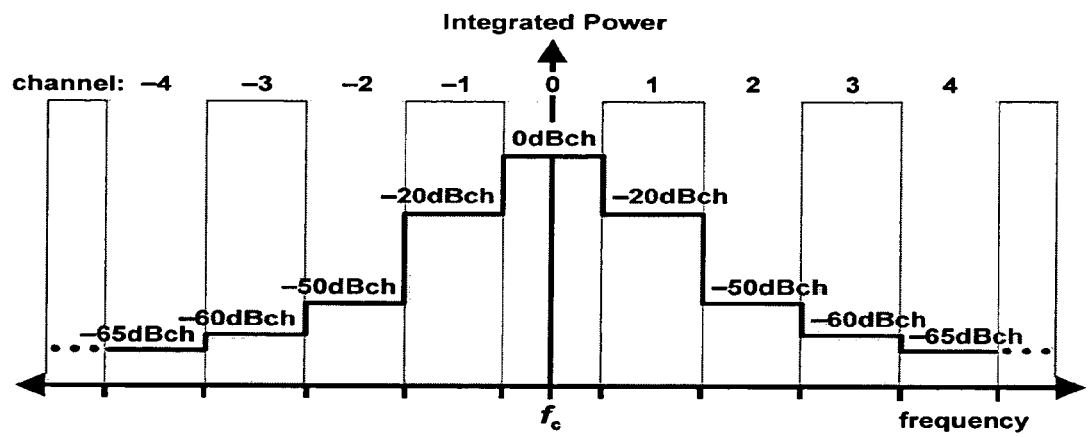
FIGS. 8A and 8B illustrate example reader system RF-power transmit masks that can be used for RFID communication.
Figure 8B:
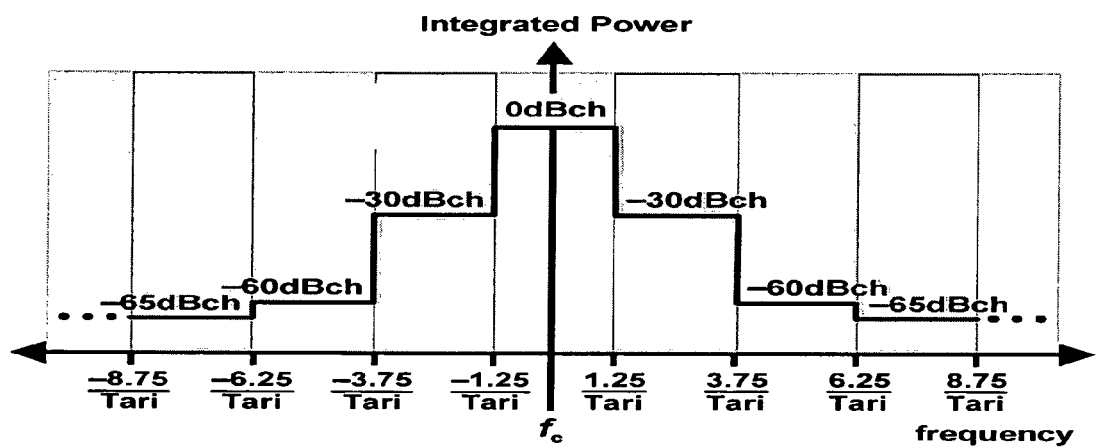

FIG. 8A shows a mask referenced to channels, whereas FIG. 8B shows a mask referenced to Tari values. Other masks are also possible.

Some of the waveform shaping parameters control a choice of a signal encoding. These include one or a combination of: a data rate; a pulse depth; a pulse rise time; a pulse fall time; a pulse width; a Tari value; a data-1 to data-0 length ratio (for signaling that uses pulse-interval encoding (PIE)); PIE ratio; TRcal pulse; RTcal pulse; a shaping of the pulses, such as sinusoidal or square-wave shaped pulses; a line code; and a preamble. Some of these can be communicated by special attributes of one or more calibration pulses. An example is now given.

Figure 9:
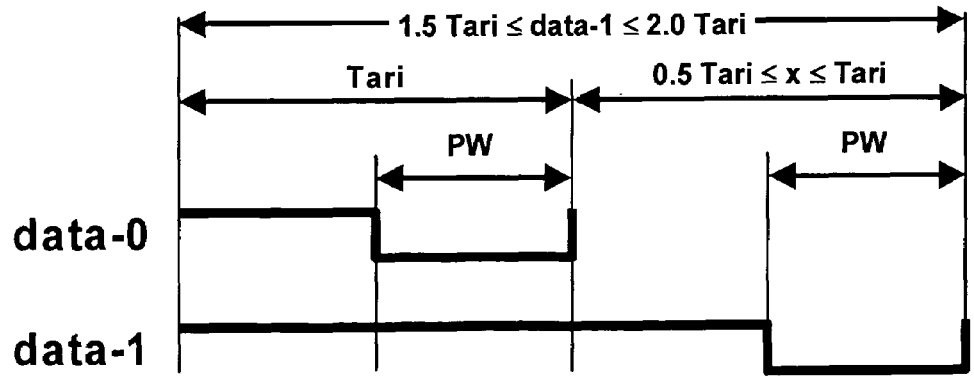
FIG. 9 illustrates Tari value, pulse width (PW), and data-1 to data-0 length ratio relative to signals that can be used for RFID communication.

FIG. 9 shows an example for R→T signaling that uses PIE, after a wave such as that of FIG. 7 has been converted by tag electronics. In this case, the durations between high→low and low→high transitions convey information. The Tari value is the length of a data zero, the PW is the width of the low pulse, and the ratio of a data-1 length to a data-0 length, such as in the range 1.5:1 to 2:1.

T→R symbols are typically encoded using a variety of line codes. Two such types of line codes are FM0 and Miller encoding, both of which are well known in the art.

Figure 10:
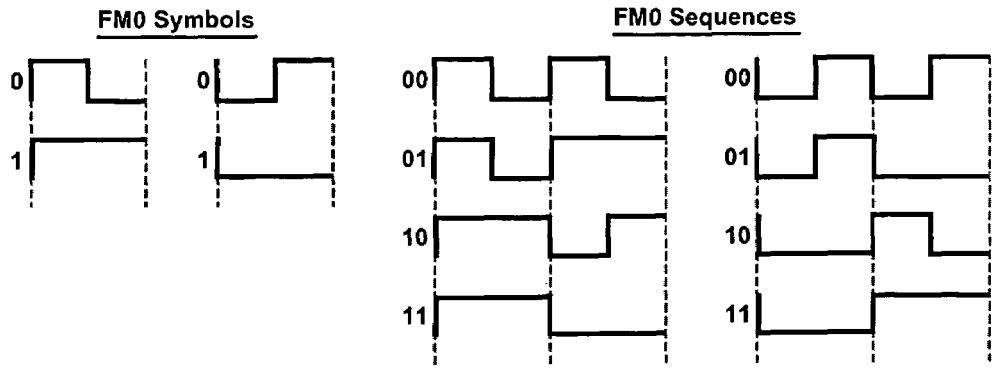
FIG. 10 illustrates FM0 symbols and FM0 sequences that can be used for RFID communication.

FIG. 10 illustrates FM0 symbols and two-bit FM0 sequences. In FM0 encoding, a transition is required at the end of each symbol period; additionally, for a zero bit, an additional transition is required in the middle of a symbol.

Tag backscatter typically begins with a transmitted preamble. Some of the waveform shaping parameters control a choice of a preamble. A reader may send a command, such as a Query command, from reader to a tag, which tells the tag which preamble to use, e.g. by setting a TRext variable. A number of preambles are possible.

Figure 11:
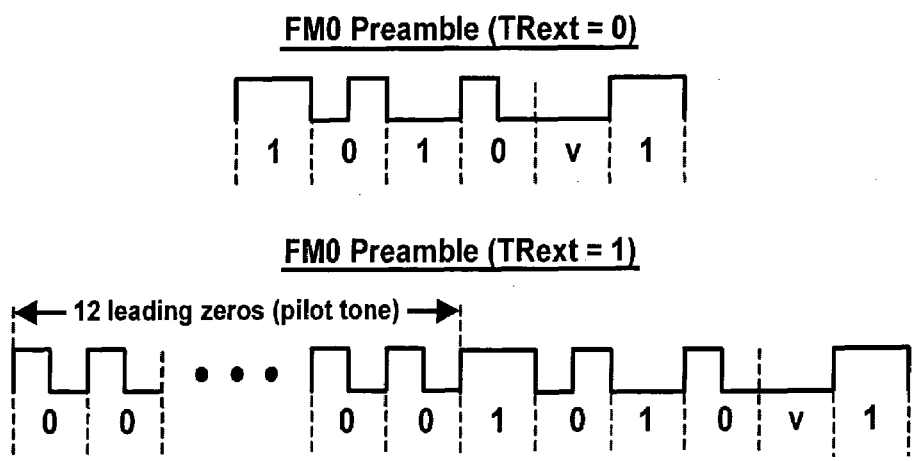
FIG. 11 illustrates FM0 preambles that can be used for RFID communication.

FIG. 11 shows two possible preambles, a short preamble (TRext=0) or a long preamble (TRext=1). As explained herein, a reader may request tags to use longer or more robust preambles (such as is illustrated for TRext=1) in noisy environments, to aid in preamble detection by the reader.

In Miller encoding, a transition occurs between two data zeros in sequence, and also in the middle of a data one. In one embodiment, a Miller symbol can contain 2, 4 or 8 subcarrier cycles for each transmitted bit.

Figure 12:
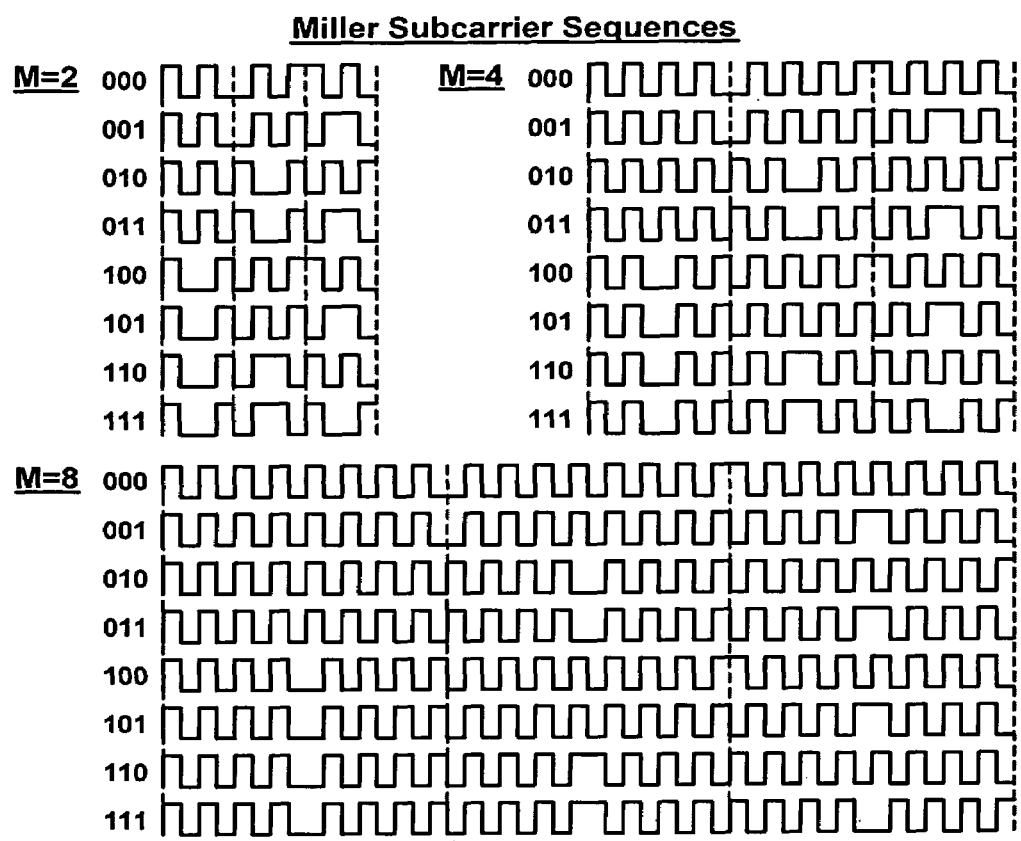
FIG. 12 illustrates possible Miller subcarrier sequences that can be used for RFID communication.

FIG. 12 illustrates some possible Miller subcarrier sequences. The symbol period is the length of a data bit (period between dashed lines). The subcarrier frequency is the frequency of the underlying waveform. M is the number of subcarrier cycles per symbol. As described above, one parameter in the T→R signal encoding is the choice of line code. If the line code permits subcarriers, additional parameters include the subcarrier frequency and the number of subcarrier cycles per symbol.

Figure 13:
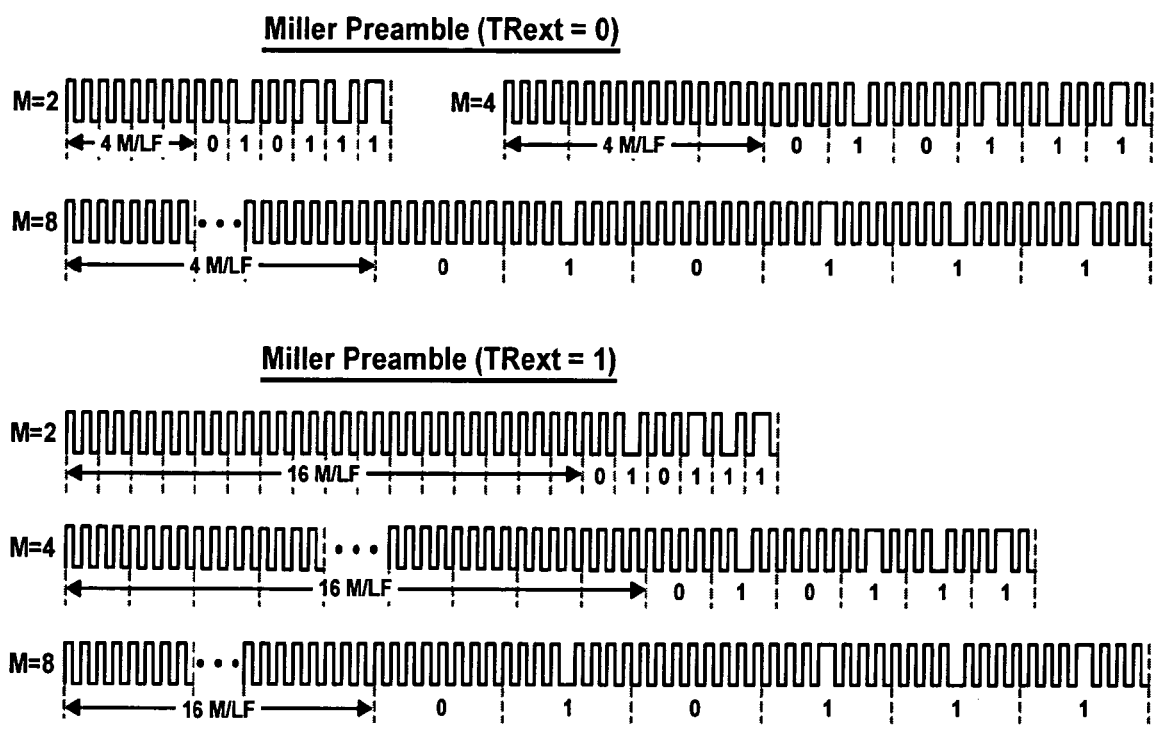
FIG. 13 illustrates possible Miller preambles with and without an additional pilot tone.

FIG. 13 shows how a Miller message from T→R can be constructed to begin with a preamble. A short preamble (TRext=0) or a long preamble (TRext=1) can be used. Other preambles are possible as well. As per the above, a reader may request tags to use a longer or more robust preamble in noisy environments, to aid in preamble detection by the reader.

In further embodiments, the waveform shaping parameter represents a protocol parameter for RFID system 100 to operate according to a communications protocol. The protocol parameter can be one, or a combination of commands, data, tag operating parameters for how tags are to operate, and the like specified by the protocol. For example, a command can be for a tag to change its state machine, or to respond in a certain manner according to the protocol. Responding can be by giving an acknowledgement (ACK), a handle such as a random number (RN), a tag code such as an EPC, etc. Or the protocol parameter can dictate an error-detection and/or correction method; a security method; a message truncation; whether the tags respond using a baseband frequency of the CW waves or a subcarrier frequency of the CW waves; parameters as to how to respond as per the above; filtering; frequency-tracking method; inventorying session identifying number; and the like.

In further embodiments, the waveform shaping parameter controls a choice of a parameter for RFID system 100 to operate under a protocol. The parameter can be one, or a combination of: an inventorying session identifying number; a state-change instruction to a tag; an error-detection and/or correction method; a security method; a message truncation; whether the tags respond using a baseband frequency of the CW waves or a subcarrier frequency of the CW waves; parameters for controlling how an RFID tag adjusts its state, generates a random number, and replies to a reader; filtering; and a frequency-tracking method.

The choices made in R→T and T→R signal encoding or protocol operation can cause the data transmissions to be more or less robust, typically slowing down or accelerating data transmission, respectively. As an example, protocol operation can add error correction to the tag backscatter, slowing down message transmission but also increasing the probability that a received message is decoded properly by the reader.

Figure 14:
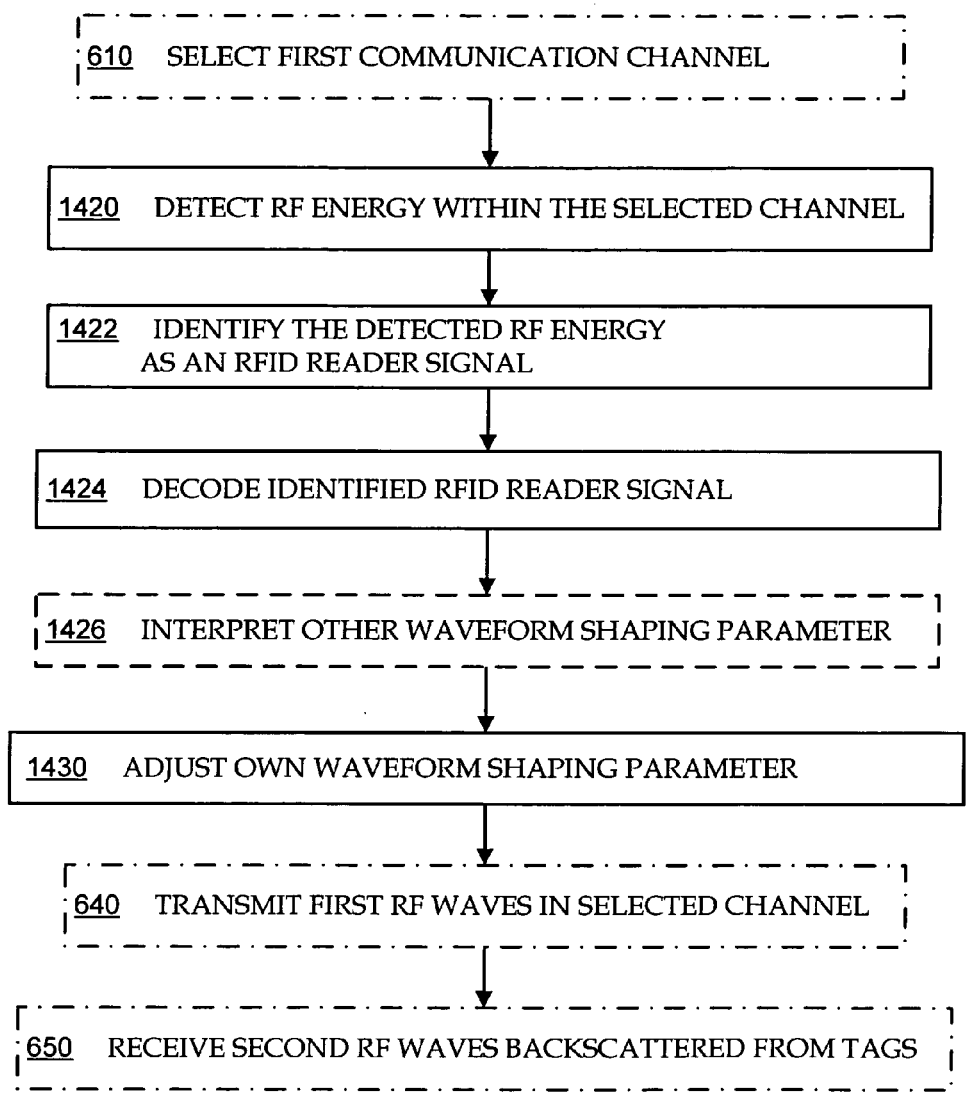
FIG. 14 is a flowchart illustrating a method according to embodiments.

FIG. 14 is a flowchart 1400 for illustrating methods according to further embodiments. The methods of flowchart 1400 are for adjusting an RFID waveform shaping parameter in view of signals from another RFID reader in the channel, and can be performed by the elements described above. The methods of flowchart 1400 include operations 610, 640 and 650, which have already been described.

According to an operation 1420, RF energy is detected within the selected channel. This may be performed similarly with how operation 620 is performed, except that RF energy need be detected only within the selected channel, not any of the related ones.

According to an operation 1422, the detected RF energy is identified as a reader system signal, such as from another RFID reader system. This can be performed by identifying characteristics of the detected RF energy, such as intensity, types of modulation, and the like.

According to an optional next operation 1424, the identified reader system signal is decoded. Decoding can take place in a number of ways, for example by checking whether a protocol of communication is being adhered to, and then decoding according to the protocol. This can be performed by functionality that can decode reader signals, provided in addition to the above mentioned functionality for decoding backscattered tag signals.

In some embodiments, the identification of operation 1422 can be performed as a result of the decoding of operation 1424, and therefore with their order interchanged. Indeed, decoding operation 1424 can start, and if it works for a reader signal, it can be inferred that the energy detected at operation 1420 was indeed a reader signal, hence the identification of operation 1422.

According to an optional operation 1426, an other waveform shaping parameter is interpreted from the reader system signal decoded at operation 1424. The other waveform shaping parameter is distinguishable from the own waveform shaping parameter as per the above, but it can be the same type of parameter or parameters.

According to an operation 1430, the own waveform shaping parameter is adjusted. This takes place similarly to the previously described operation 630, but this time in view of the reader system signal decoded at operation 1424. If optional operation 1426 has also taken place, then the own waveform shaping parameter can be adjusted also in view of the interpreted other waveform shaping parameter.

Then operations 640 and 650 take place as described previously.

In a number of embodiments, RFID readers query RFID tags in what is called an inventorying session. A reader sends to the tag a Query command containing a parameter Q. Each tag generates a random number in the range from zero to $2^Q-1$, and any tag that generates a zero replies to the reader. If the reader observes a single tag replying in response to the Query, it acknowledges the single tag by transmitting an ACK command. This method of uniquely identifying RFID tags is a variant of the well-known slotted-Aloha collision-arbitration algorithm, and is particularly well suited for use in RFID systems.

To maximize the probability that a single tag, among all the tags in the field, will eventually generate a zero, the reader should choose Q such that $2^Q-1$ is approximately equal to the number of tags in the field, as described in copending published U.S. patent application 2005/0280507, Ser. No. 11/210,573, filed on Aug. 24, 2005 and titled: "INVENTORYING RFID TAGS BY EMPLOYING A QUERY PARAMETER Q THAT CONVERGES HEURISTICALLY".

In these embodiments, the other waveform shaping parameter includes an interpreted Q parameter suitable for controlling how an RFID tag generates a random number during an inventorying session. In those embodiments, the own waveform shaping parameter encodes a transmitted Q parameter whose value is determined from a value of the interpreted Q parameter.

The value of the transmitted Q parameter can be determined in any number of ways. It can be equal to that of the interpreted Q parameter. Or it can be a statistic of a number of interpreted Q parameter, such as a mean.

A R→T waveform shaping parameter can encode a tag operating parameter, such as the Q parameter, that controls how an RFID tag generates a random number. In one embodiment of the present invention a Q parameter, decoded from another RFID reader 560, can be advantageously used to adjust a waveform shaping parameter of reader 510. For example, the decoded Q parameter from reader 560 can be used to adjust a Q parameter of reader 510. In one embodiment, the encoded Q parameter of reader 510 starts at a value equal to the Q parameter decoded from reader or readers 560. Further, multiple decoded commands from a reader or readers 560 can yield a plurality of decoded Q parameters, and the encoded Q parameter of reader 510 can start at a value equal to a mean value of the plurality of decoded Q parameters.

In yet another embodiment, in the decoded signal from the other reader or readers 560, a Query Command is not followed by an ACK command, in which case the encoded Q parameter of reader 510 is set to zero.

The following examples help explain the above-mentioned responses to decoded signals from another reader or readers 560. In response to other readers 560 sending Query commands with Q=0, a judgment is made that there may be few or no tags in the field and reader 510 starts an inventory round with a wave-shaping parameter encoding Q=0.

In response to other readers 560 sending Query commands with Q values ranging from 0 to 4, a judgment is made that there may be at most $2^4-1=15$ tags in the field, and reader 510 starts an inventory round with a wave-shaping parameter encoding Q=4.

In response to other readers 560 sending Query commands with widely different Q values, a judgment is made that there are an unknown number of tags in the field, and reader 510 starts an inventory round with Q set to the mean of the observed values the other readers 560 are using.

In response to other readers 560 sending Query commands but no ACK commands, a judgment is made that there may be few or no tags in the field and reader 510 starts an inventory round with Q=0, so the first powered tag will always generate a random number equal to $2^0-1=0$ and will reply without delay.

In response to another reader 560 sending a Write command, a judgment is made that the other reader is performing a difficult/sensitive operation that should not be interrupted, and reader 510 avoids transmitting. Alternatively, reader 510 can use a narrow transmit bandwidth and low transmit power to avoid interrupting reader 560 that is sending the Write command.

In response to other readers 560 sending Query commands and no ACK commands, but reader 510 is seeing many tags, a judgment is made by reader 510 to aggregate multiple channels and use the aggregated channel for transmissions. Reader 510 may make this decision because the other readers 560 are not seeing any tags so they are less susceptible to interference, whereas reader 510 needs extra signal bandwidth to increase its communication rate and inventory all the tags.

In response to other readers 560 using low values of Q, a judgment is made that there are few tags in the field and reader 510 can transmit intermittently rather than continuously.

In response to other readers 560 using high values of Q, a judgment is made that there are many tags in the field and reader 510 can transmit continuously rather than intermittently.

In response to detected signals from a reader or readers 560 having a received power level or levels below an interference threshold, a judgment is made that the other reader or readers 560 are far away, so the tag subcarrier backscatter frequency can be placed in a different channel from the reader 510 transmissions without risk of interference from other readers 560.

In response to other readers operating using R→T and T→R communication parameters (i.e. Tari, backscatter data rate, etc.) consistent with densely populated reader environments (hereinafter "dense-reader mode"), a judgment is made by reader 510 that the environment is densely populated with readers 560, so reader 510 uses a dense-reader mode. In response to other readers 560 using a dense-reader mode, but their received power at reader 510's antenna is low, a judgment is made by reader 510 that the environment is densely populated with readers 560, but they are not nearby. As such, reader 510 can use a non-dense-reader mode.

In response to other readers 560 using a dense-reader mode, but, based on the observed channel occupancy there are few readers 560 actually transmitting, a judgment is made by reader 510 that the environment may have been densely populated with readers 560 but some of them have turned off. Reader 510 can then use a non-dense-reader mode rather than a dense-reader mode. If the other readers 560 subsequently transition to a non-dense-reader mode, then reader 510 can stay in a non-dense-reader mode. If the other readers 560 stay in a dense-reader mode, then they must be experiencing interference issues, so reader 510 can switch to a dense-reader mode.

In response to other readers 560 issuing Select commands, such that only tags that are applied to specific products will reply, a judgment is made that there is a priority in finding tags on such specific products and reader 510 can then report the identification of such tags with high priority.

In some embodiments the RF energy encountered may be signals from tags 550 communicating with other readers 560. These signals are decodable and can be used by reader 510 to adjust waveform shaping parameters.

Figure 15A:
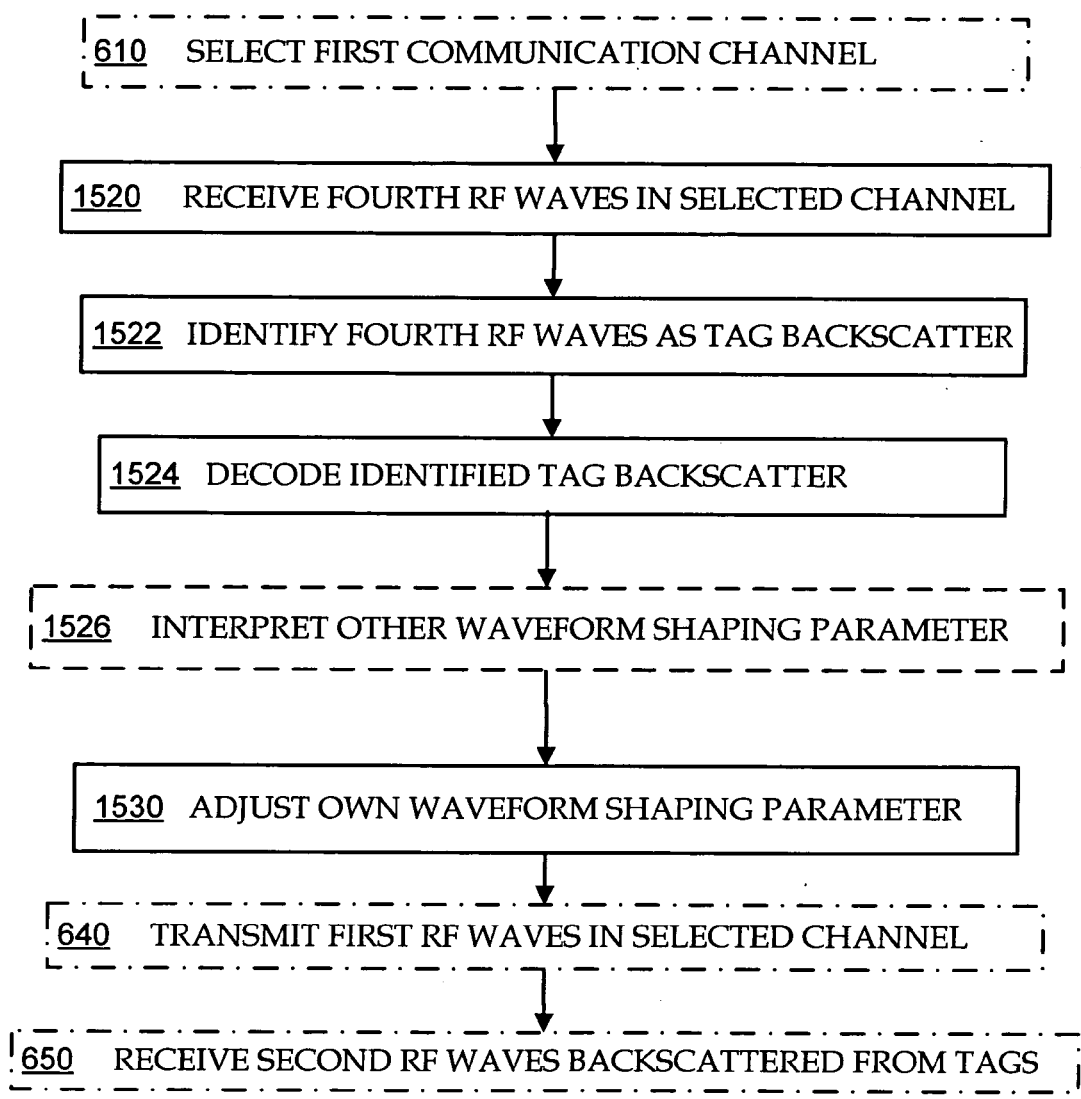
FIG. 15A is a flowchart illustrating a method according to embodiments.

FIG. 15A is a flowchart 1500 for illustrating methods according to further embodiments. The methods of flowchart 1500 are for adjusting an RFID waveform shaping parameter in view of detected RFID tag signals, and can be performed by the elements described above. The methods of flowchart 1500 include operations 610, 640 and 650 already described above.

According to an operation 1520, fourth RF waves are detected and received in the selected channel. This may be performed similarly with how operation 620 is performed, except that only the selected channel is monitored.

According to a next operation 1522, the received fourth RF waves are identified as backscatter from RFID tags, which happen to be in the field of view. This can be performed by identifying characteristics of the received fourth RF waves, such as intensity, types of modulation, and the like.

According to a next operation 1524, the identified tag backscatter is decoded. Decoding can take place in a number of ways, for example by checking whether a protocol for encoding is being followed, and then decoding according to the protocol. This can be performed by the functionality that would decode backscattered tag signals under normal communication.

In some embodiments, the identification of operation 1522 can be performed as a result of the decoding of operation 1524, and therefore with their order interchanged. Indeed, decoding operation 1524 can start, and if it works for tag signals, it can be inferred that the fourth RF waves detected at operation 1520 were indeed a backscattered tag signals, hence the identification of operation 1522.

According to an optional operation 1526, an other waveform shaping parameter is interpreted from the tag backscatter decoded at operation 1524. The other waveform shaping parameter is distinguishable from the own waveform shaping parameter as per the above, but it can be the same type of parameter or parameters.

Then according to an operation 1530, the own waveform shaping parameter is adjusted. This takes place similarly to the previously described operation 630, but this time in view of the tag backscatter decoded at operation 1524. If optional operation 1526 has also taken place, then the own waveform shaping parameter can be adjusted also in view of the interpreted other waveform shaping parameter.

Then operations 640 and 650 take place as described previously.

Figure 15B:
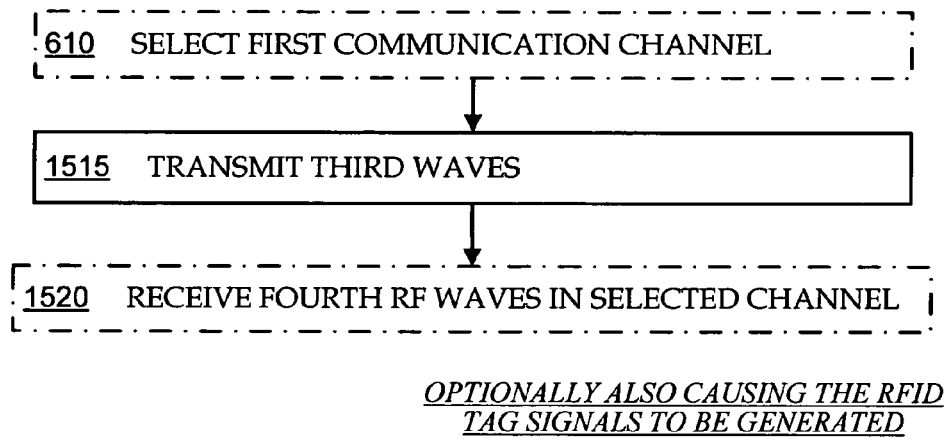
FIG. 15B is a flowchart illustrating an optional variation of the method of FIG. 15A.

FIG. 15B is a flowchart 1550 illustrating an optional variation of the method of FIG. 15A. Operations 610 and 1520 are shown again, from flowchart 1500.

In some embodiments, according to an operation 1515, occurring prior to operation 1520, third RF waves are transmitted. The third RF waves can thus be transmitted to detect if there are any tags present. Then the fourth RF waves are received from the tags, in response to transmitting the third RF waves.

The third RF waves can be transmitted from the reader according to the invention, or not. They can be within the selected channel, or outside it.

Figure 15C:
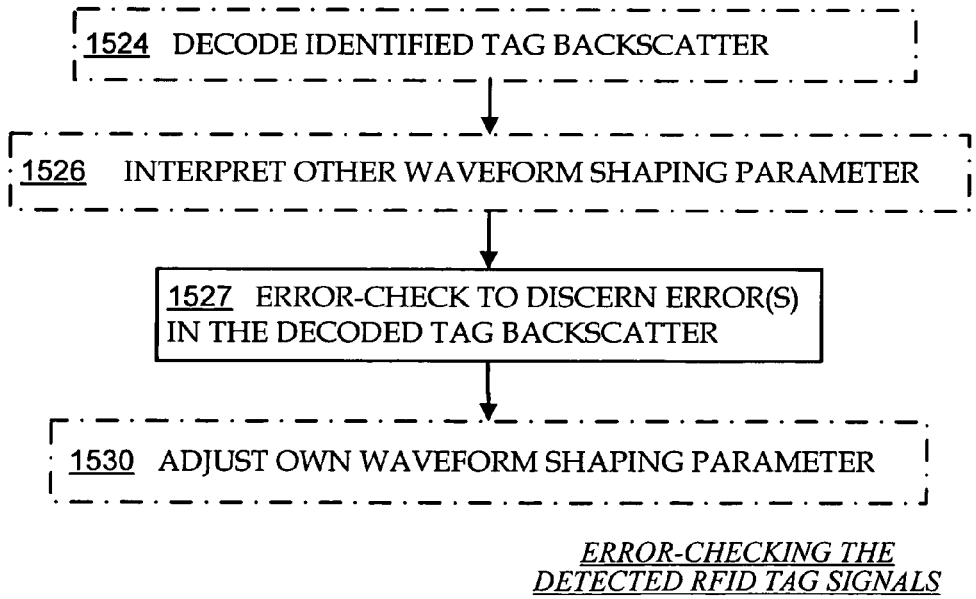
FIG. 15C is a flowchart illustrating another optional variation of the method of FIG. 15A.

FIG. 15C is a flowchart 1570 illustrating another optional variation of the method of FIG. 15A. Operations 1524, 1526, and 1530 are shown again, from flowchart 1500.

In some embodiments, according to a further optional operation 1527, the tag backscatter is error-checked, to discern any possible errors. Then the waveform shaping parameter can adjusted also responsive to whether an error was discerned, and also optionally further as to what the error was.

Error-checking can be performed in a number of ways, as can adjustment responsive to whether an error was discerned, and even what type it was. A number of such ways are described in copending published U.S. patent application Ser. No. 11/388,235 filed on Mar. 26, 2006, entitled "ERROR RECOVERY IN RFID READER SYSTEMS".

This error-checking feature is particularly useful in embodiments of the invention that have not caused the fourth RF waves to be transmitted, e.g. by transmitting the third waves of operation 1515. This way, the fourth RF waves that are received in operation 1520 are in response to an action by another reader, instead.

In some embodiments, checking for errors can include comparing the amplitude of a received waveform segment with one or more thresholds. In some of these, an error is discerned if the amplitude is greater than a first threshold, or less than a second threshold, or between the thresholds, and so on.

In embodiments where an other waveform shaping parameter is interpreted from the decoded tag backscatter, error-checking can be performed on that other waveform shaping parameter.

In embodiments where the tag backscatter of the fourth RF waves includes a group of symbols, an error can be discerned if a redundant one of the symbols does not meet a condition with respect to others of the symbols. So, error-checking can be implemented by decoding a parity symbol or symbols that implement an error-detecting code, such as a cyclic redundancy check (CRC), and/or that implement a corresponding error-correcting code.

In some embodiments, the own waveform shaping parameter is adjusted depending on how many errors are occurring. For example, an error count can be updated in response to discerning an error. Then the own waveform shaping parameter can be adjusted responsive to whether the error count exceeds an error threshold. The error threshold can be set according to a tolerance for errors.

The error-count feature can be used in a number of ways. For example, a second count can be maintained of how often an error is checked for ("checking events"), and the ratio of the error count to the checking events can be compared to a threshold. Additionally, the error count, checking events, or both can be periodically examined and then reset, such as within a time period, or can be maintained and updated without resetting (e.g. counting over the lifetime of checking).

Figure 16:
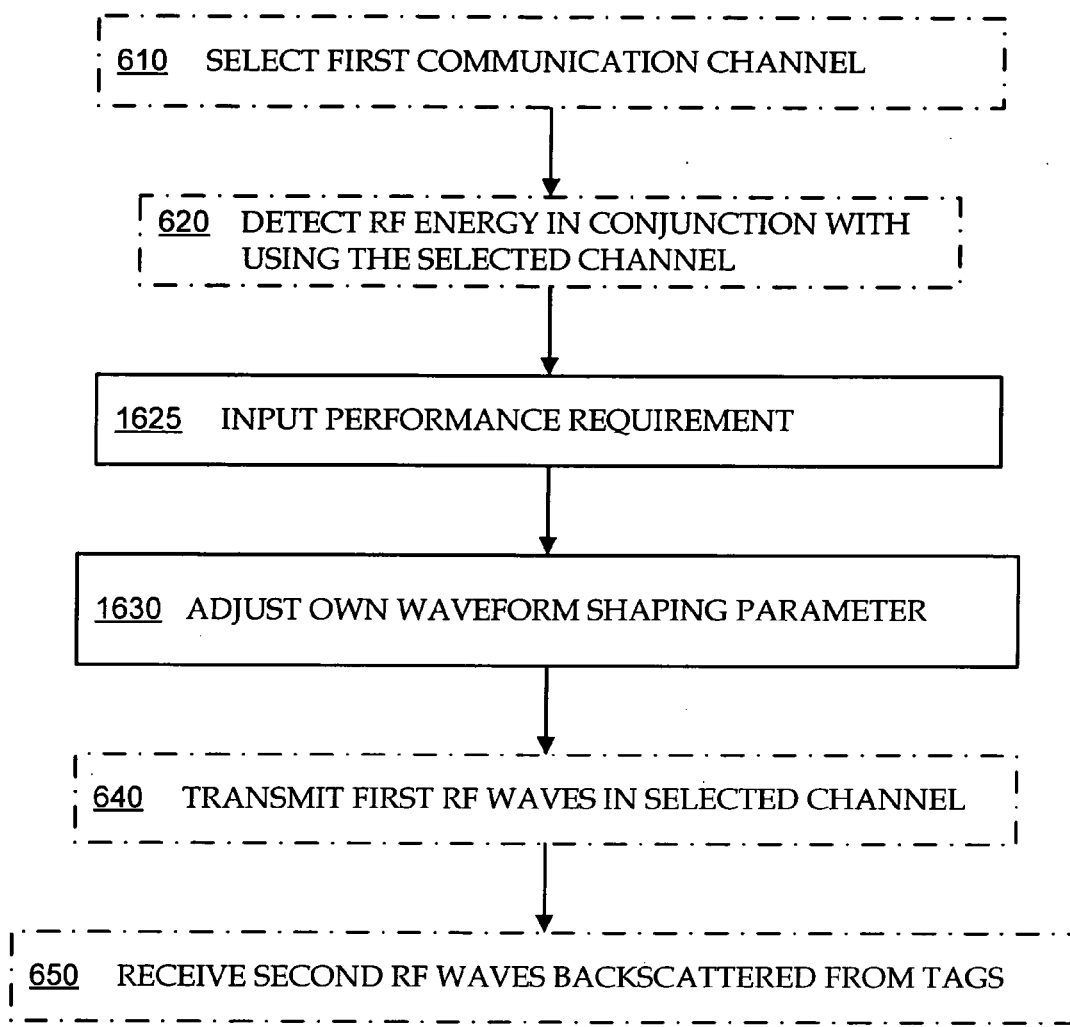
FIG. 16 is a flowchart illustrating a method according to embodiments.

FIG. 16 is a flowchart 1600 for illustrating methods according to further embodiments. The methods of flowchart 1600 are for adjusting an RFID waveform shaping parameter in view also a performance requirement, and can be performed by the elements described above. The methods of flowchart 1600 include operations 610, 640 and 650 already described above, and optionally also operation 620.

According to an operation 1625, a performance requirement is input. Inputting can be performed in any number of ways, such as from a memory, an interface such as a user interface, and so on.

According to an operation 1630, a waveform shaping parameter is adjusted, responsive to the performance requirement. This operation is performed similarly to how operation 630 is performed, except that the performance requirement is also heeded. In addition, if optional operation 620 has also been implemented and RF energy has been detected, the waveform shaping parameter is adjusted also responsive to the detected RF energy.

Then operations 640 and 650 take place as described previously.

In some embodiments, the performance requirement is a suitable statistic of performance for an RFID reader system reading RFID tags. For example, the statistic can be a maximum error rate, a minimum tag throughput rate, a minimum signal degradation amount, and so on. Or it can be a time statistic to successfully read one or all of the tags.

In some embodiments, the performance requirement is expressed in terms of a probability. For example, some of the above mentioned or other statistics can be expressed in terms of respective probabilities.

In some embodiments, a value for the own waveform shaping parameter is proposed internally. Then a compliance probability is estimated of whether the proposed value will cause the performance requirement to be met. The proposed value is then adopted only if the compliance probability exceeds a confidence threshold.

In some embodiments, the performance requirement is expressed in terms of a metric, such as in terms of an error rate, a tag throughput rate, a signal degradation amount, a delay, and so on. Then a value for the own waveform shaping parameter is computed, which would result in performance in which that metric is optimized. Then the computed value is adopted. The same can be also with a combination of such metrics, and so on.

In some embodiments, the performance requirement itself constrains a choice for the waveform shaping parameter. For example, the constrained choice can be that of signal encoding. In some particular instances, choices can be constrained for only line codes that permit subcarrier modulation, of the type discussed above with reference to FIG. 12.

Figure 17A:
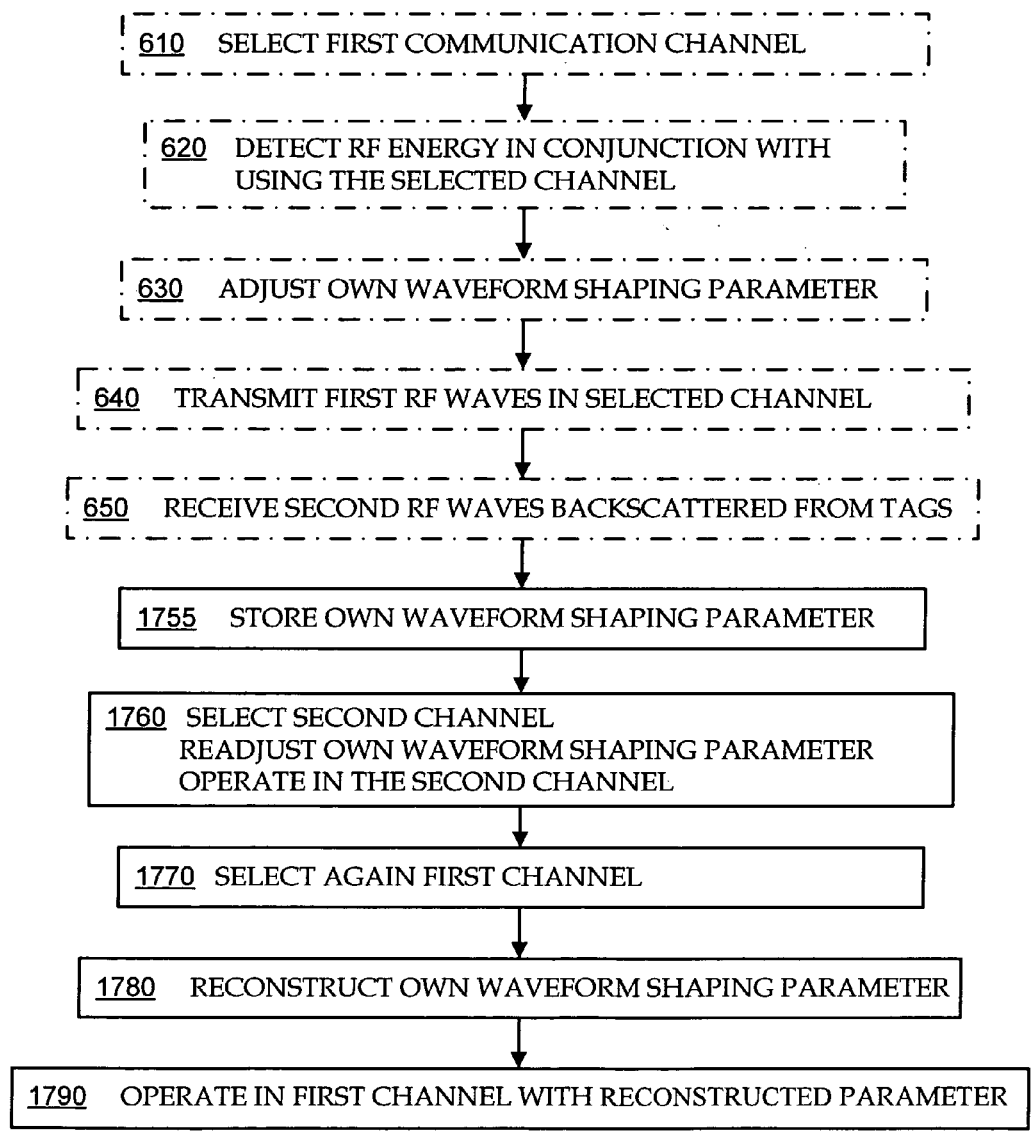
FIG. 17A is a flowchart illustrating a method according to embodiments.

FIG. 17A is a flowchart 1700 for illustrating methods according to further embodiments. The methods of flowchart 1700 include operations 610, 620, 630, 640 and 650 already described above.

According to an operation 1755, a first channel parameter value is stored, which is associated with the waveform shaping parameter that was adjusted at operation 630, and used in the first channel. This way the adjusted waveform shaping parameter can be later recalled, either in part or entirely, for reuse in the first channel.

There can be many such types of channel parameter values for a channel such as the first channel. For example, the channel parameter value can include a designator for the channel, a designator for a parameter of the channel, settings for a parameter of the channel, last tried settings for a parameter of the first channel, and so on.

According to another operation 1760, a second one of the channels is then selected. Then there is operation in the selected second channel by transmitting to the RFID tags third RF waves in the second channel and receiving fourth RF waves backscattered from the RFID tags in response to the third RF waves. Concurrently with thus operating in the selected second channel, the own waveform shaping parameter is optionally readjusted.

According to another operation 1770, the first channel is then selected again. This can take place as described in connection with operation 610.

According to another operation 1780, the own waveform shaping parameter is reconstructed from the stored first parameter value. This operation 1780 is performed in association with operation 1770, meaning they can be performed in either order or concurrently with each other.

According to another operation 1790, there is RFID operation again in the reselected first channel, after operation 1760 in the second channel. This RFID operation includes transmitting to the RFID tags fifth RF waves in the reselected first channel, and receiving sixth RF waves backscattered from the RFID tags in response to the fifth RF waves. For this operation, at least some of one of the fifth and the sixth RF waves have a waveform with a shape according to the reconstructed own waveform shaping parameter.

Figure 17B:
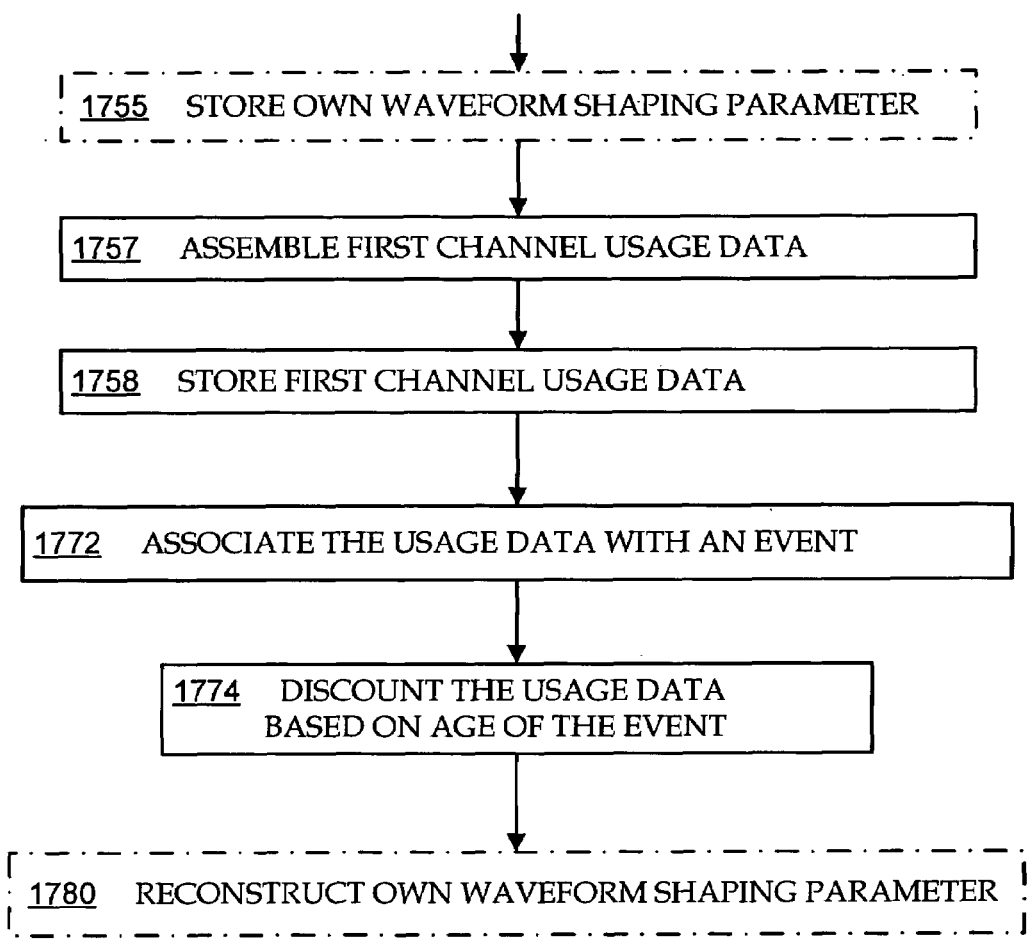
FIG. 17B is a flowchart illustrating an optional variation of the method of FIG. 17A.

FIG. 17B is a flowchart 1756 for illustrating an optional variation of the method of FIG. 17A. Operations 1755 and 1780 are shown again, from flowchart 1500.

According to an operation 1757, first channel usage data is assembled about operation in the first channel. The first channel usage data is assembled from one or more of the detected RF energy, the first RF waves and the second RF waves. For example, it can be one or more measurements about the detected RF energy and the second RF waves. The first channel usage data can also advantageously include a designator for the first channel, a designator for a parameter of the first channel, settings for a parameter of the first channel, last tried settings for a parameter of the first channel, performance statistics for a parameter of the first channel, and a preference rank for the first channel, etc.

More particularly, within a channel, a reader can choose T→R and R→T parameters to optimize SNR. A reader may also choose T→R and R→T parameters to get around interference or to optimize SINR. These settable parameters of operation can be assembled into the first channel usage data.

For a first example, in low-noise channels, a reader may choose to maximize the link data rate at the expense of signaling robustness, choosing, as one example, a short Tari value. In high-noise channels, a reader may choose to maximize link robustness at the expense of data rate, choosing, as one example, a long Tari value.

For a second example, to get around RF interference a reader may choose a Miller subcarrier frequency that places the tag backscatter spectrum away from the interferer. Also, a reader may set T→R and R→T parameters based on what it sees other readers are doing. If other readers are in dense-reader mode, then it also uses dense-reader mode. Finally a reader may choose its own link parameters based on its own assessment, or on the combined assessment of it and other readers, both at the current time and considering prior times, about the state of the RFID environment.

In these embodiments, in the above mentioned operation 1780, the one or more own waveform shaping parameters are reconstructed also according to the first channel usage data. Accordingly, channel operation becomes improved on an individualized basis.

According to an optional operation 1757, the assembled first channel usage data is stored, such as in a memory. Thus the stored first channel usage data can be recalled, when the waveform shaping parameter is to be reconstructed at operation 1780.

Of course, what is written above about the first channel can be repeated about the other channels. So, second channel usage data can be assembled about operating in the second channel, e.g. from the third RF waves or the fourth RF waves or both. The second channel usage data can be stored, then later recalled for reconstructing an own waveform shaping parameter for operating in the second channel and so on. This is particularly useful when an RFID reader system has to hop frequently among different channels.

Furthermore, the parameters of one channel can be compared to those of the others. This is especially useful for performance parameters, such as throughput at each channel, and can be also advantageously imparted in the first channel usage data. And even more, the channel performance statistics can be compared to each other, to arrive at the above mentioned preference rank for an individual channel relative to the others. The ranks can in turn be consulted for readers to choose channels where they expect to result in improved performance statistics, and so on.

According to another optional operation 1772, the first channel usage data becomes associated with an event. The event can be any convenient event, such as when operation in the first channel ends. It can also be another event, such as when interference becomes known or detected to have started or ended. The associating is preferably in terms of a time, such as by including a time of the event. A time stamp can be included, for example, in the first usage data.

Then, when the waveform shaping parameter is reconstructed, the usage data can be discounted according to an age of the event. Discounting may be performed in many ways. For example, if the event is recent, the data is probably still useful. But if an event age is high, such as by not having operated in the first channel for a long time, then the corresponding first channel usage data is not necessarily useful, and could be ignored. Useful first channel usage data to keep track of this way include the detected RF energy, such as from the environment. For those, if the age is beyond a threshold, the old data can be discarded and new data received and stored.

In addition to merely weighting events based on age (e.g. time since last observed), and type (e.g. noise or interference), in some applications a reader can "learn" the temporal history of the environment and take advantage of the predictable recurrence of certain events. For example, suppose that every 20 minutes an industrial refrigeration compressor near the reader starts up and momentarily floods channels 1 to 5 with RF noise. Knowing this, the reader can simply avoid these channels at the appropriate times. The reader may also choose to occasionally re-survey channels 1 to 5 during the noise event, to verify that the temporal or RF nature of the event has not changed.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense.

Indeed, it should be readily apparent to those skilled in the art that what is described herein may be modified in numerous ways. Such ways can include equivalents to what is described herein.

The following claims define certain combinations and subcombinations of elements, features, steps, and/or functions, which are regarded as novel and non-obvious. Additional claims for other combinations and subcombinations may be presented in this or a related document.

The claimed invention is:

1. An RFID reader system comprising:
   an antenna; and
   an operational processing block coupled to the antenna and operable to
      select a first one of a plurality of communication channels;
      identify RF energy detected within the selected channel as a reader system signal from another RFID reader system;
      decode the identified reader system signal;
      adjust an own waveform shaping parameter responsive to the decoded reader system signal; and
      cause the antenna to transmit to RFID tags first RF waves in the selected channel such that second RF waves are backscattered from the RFID tags in response to the first RF waves, in which at least some of one of the first RF waves and the second RF waves have a waveform with a shape according to the adjusted own waveform shaping parameter.

2. The system of claim 1, in which
   the RF waves having a waveform with a shape according to the adjusted own waveform shaping parameter are the first waves.

3. The system of claim 1, in which
   the RF waves having a waveform with a shape according to the adjusted own waveform shaping parameter are the second waves.

4. The system of claim 1, in which
   the own waveform shaping parameter controls a choice of a modulation format.

5. The system of claim 1, in which
   the own waveform shaping parameter controls a choice of a preamble.

6. The system of claim 1, in which
   the own waveform shaping parameter controls a choice of a signal encoding.

7. The system of claim 6, in which
   the own waveform shaping parameter communicates one or a combination: of a data rate, a mode, attributes of a calibration pulse, a rise time, a fall time, a pulse shaping, a pulse width, and a preamble.

8. The system of claim 1, in which
   the own waveform shaping parameter represents a protocol parameter for an RFID system according to a communications protocol.

9. The system of claim 8, in which
   the protocol parameter includes a command for a tag to change its state machine.

10. The system of claim 8, in which
    the protocol parameter includes a command for a tag to respond in a certain manner according to the protocol.

11. The system of claim 1, in which
    the operational processing block is further operable to interpret an other waveform shaping parameter from the decoded reader system signal, and
    the own waveform shaping parameter is adjusted responsive to the other waveform shaping parameter.

12. The system of claim 11, in which
    the other waveform shaping parameter controls a choice of a modulation format.

13. The system of claim 11, in which
    the other waveform shaping parameter controls a choice of a signal encoding.

14. The system of claim 13, in which
    the other waveform shaping parameter communicates one or a combination of a data rate, a mode, attributes of a calibration pulse, a rise time, a fall time, a pulse width, and a preamble.

15. The system of claim 11, in which
    the other waveform shaping parameter represents an other protocol parameter for an RFID system according to a communications protocol.

16. The system of claim 15, in which
    the other protocol parameter includes a command for a tag to change its state machine.

17. The system of claim 15, in which
    the other protocol parameter includes a command for a tag to respond in a certain manner according to the protocol.

18. The system of claim 11, in which
    the other waveform shaping parameter includes an interpreted Q parameter suitable for controlling how an RFID tag generates a random number during an inventorying session, and
    the own waveform shaping parameter encodes a transmitted Q parameter whose value is determined from a value of the interpreted Q parameter.

19. The system of claim 18 in which
    the value of the transmitted Q parameter is the equal to that of the interpreted Q parameter.

20. The system of claim 18 in which
    the other waveform shaping parameter does not include a corresponding ACK command, and
    the transmitted Q parameter has value of zero.

21. An RFID reader system operable to communicate with RFID tags, comprising:
    selecting means for selecting a first one of a plurality of communication channels;
    detecting means for detecting RF energy within the selected channel;
    identifying means for identifying the detected RF energy as a reader system signal from another RFID reader system;
    decoding means for decoding the identified reader system signal;
    adjusting means for adjusting an own waveform shaping parameter responsive to the decoded reader system signal; and
    antenna means for transmitting to the RFID tags first RF waves in the selected channel and for receiving second RF waves backscattered from the RFID tags in response to the first RF waves, at least some of one of the first and second RF waves having a waveform with a shape according to the adjusted own waveform shaping parameter.

22. The system of claim 21, in which
    the RF waves having a waveform with a shape according to the adjusted own waveform shaping parameter are the first waves.

23. The system of claim 21, in which
    the RF waves having a waveform with a shape according to the adjusted own waveform shaping parameter are the second waves.

24. The system of claim 21, in which
the own waveform shaping parameter controls a choice of a modulation format.
25. The system of claim 21, in which
the own waveform shaping parameter controls a choice of a preamble.
26. The system of claim 21, in which
the own waveform shaping parameter controls a choice of a signal encoding.
27. The system of claim 21, further comprising:
interpreting means for interpreting from the decoded reader system signal an other waveform shaping parameter, and
in which the own waveform shaping parameter is adjusted responsive to the other waveform shaping parameter.
28. The system of claim 27, in which
the other waveform shaping parameter represents an other protocol parameter for an RFID system according to a communications protocol.
29. The system of claim 28, in which
the other protocol parameter includes a command for a tag to change its state machine.
30. The system of claim 28, in which
the other protocol parameter includes a command for a tag to respond in a certain manner according to the protocol.
31. The system of claim 27, in which
the other waveform shaping parameter includes an interpreted Q parameter suitable for controlling how an RFID tag generates a random number during an inventorying session, and
the own waveform shaping parameter encodes a transmitted Q parameter whose value is determined from a value of the interpreted Q parameter.
32. An article comprising: a storage medium, the storage medium having instructions stored thereon, in which when the instructions are executed by at least one component of an RFID reader system that is operable to communicate with RFID tags, they result in:
selecting a first one of a plurality of communication channels;
detecting RF energy within the selected channel;
identifying the detected RF energy as a reader system signal from another RFID reader system;
decoding the identified reader system signal;
adjusting an own waveform shaping parameter responsive to the decoded reader system signal; and
transmitting to the RFID tags first RF waves in the selected channel and receiving second RF waves backscattered from the RFID tags in response to the first RF waves, at least some of one of the first and second RF waves having a waveform with a shape according to the adjusted own waveform shaping parameter.
33. The article of claim 32, in which
the RF waves having a waveform with a shape according to the adjusted own waveform shaping parameter are the first waves.
34. The article of claim 32, in which
the RF waves having a waveform with a shape according to the adjusted own waveform shaping parameter are the second waves.
35. The article of claim 32, in which
the own waveform shaping parameter controls a choice of a modulation format.
36. The article of claim 32, in which
the own waveform shaping parameter controls a choice of a preamble.
37. The article of claim 32, in which
the own waveform shaping parameter controls a choice of a signal encoding.
38. The article of claim 37, in which
the own waveform shaping parameter communicates one or a combination: of a data rate, a mode, attributes of a calibration pulse, a rise time, a fall time, a pulse shaping, a pulse width, and a preamble.
39. The article of claim 32, in which
the own waveform shaping parameter represents a protocol parameter for an RFID system according to a communications protocol.
40. The article of claim 39, in which
the protocol parameter includes a command for a tag to change its state machine.
41. The article of claim 39, in which
the protocol parameter includes a command for a tag to respond in a certain manner according to the protocol.
42. The article of claim 32, in which when the instructions are executed, they further result in:
interpreting from the decoded reader system signal an other waveform shaping parameter, and
in which the own waveform shaping parameter is adjusted responsive to the other waveform shaping parameter.
43. The article of claim 42, in which
the other waveform shaping parameter controls a choice of a modulation format.
44. The article of claim 42, in which
the other waveform shaping parameter controls a choice of a signal encoding.
45. The article of claim 44, in which
the other waveform shaping parameter communicates one or a combination of a data rate, a mode, attributes of a calibration pulse, a rise time, a fall time, a pulse width, and a preamble.
46. The article of claim 42, in which
the other waveform shaping parameter represents an other protocol parameter for an RFID system according to a communications protocol.
47. The article of claim 46, in which
the other protocol parameter includes a command for a tag to change its state machine.
48. The article of claim 46, in which
the other protocol parameter includes a command for a tag to respond in a certain manner according to the protocol.
49. The article of claim 42, in which
the other waveform shaping parameter includes an interpreted Q parameter suitable for controlling how an RFID tag generates a random number during an inventorying session, and
the own waveform shaping parameter encodes a transmitted Q parameter whose value is determined from a value of the interpreted Q parameter.
50. The article of claim 49, in which
the value of the transmitted Q parameter is the equal to that of the interpreted Q parameter.
51. The article of claim 49, in which
the other waveform shaping parameter does not include a corresponding ACK command, and
the transmitted Q parameter has value of zero.
52. A method for an RFID reader system to communicate with RFID tags, comprising:
selecting a first one of a plurality of communication channels;
detecting RF energy within the selected channel;
identifying the detected RF energy as a reader system signal from another RFID reader system;

decoding the identified reader system signal;

adjusting an own waveform shaping parameter responsive to the decoded reader system signal; and transmitting to the RFID tags first RF waves in the selected channel and receiving second RF waves backscattered from the RFID tags in response to the first RF waves, at least some of one of the first and second RF waves having a waveform with a shape according to the adjusted own waveform shaping parameter.

53. The method of claim 52, in which
the RF waves having a waveform with a shape according to the adjusted own waveform shaping parameter are the first waves.

54. The method of claim 52, in which
the RF waves having a waveform with a shape according to the adjusted own waveform shaping parameter are the second waves.

55. The method of claim 52, in which
the own waveform shaping parameter controls a choice of a modulation format.

56. The method of claim 52, in which
the own waveform shaping parameter controls a choice of a preamble.

57. The method of claim 52, in which
the own waveform shaping parameter controls a choice of a signal encoding.

58. The method of claim 57, in which
the own waveform shaping parameter communicates one or a combination: of a data rate, a mode, attributes of a calibration pulse, a rise time, a fall time, a pulse shaping, a pulse width, and a preamble.

59. The method of claim 52, in which
the own waveform shaping parameter represents a protocol parameter for an RFID system according to a communications protocol.

60. The method of claim 59, in which
the protocol parameter includes a command for a tag to change its state machine.

61. The method of claim 59, in which
the protocol parameter includes a command for a tag to respond in a certain manner according to the protocol.

62. The method of claim 52, further comprising:
interpreting from the decoded reader system signal an other waveform shaping parameter, and
in which the own waveform shaping parameter is adjusted responsive to the other waveform shaping parameter.

63. The method of claim 62, in which
the other waveform shaping parameter controls a choice of a modulation format.

64. The method of claim 62, in which
the other waveform shaping parameter controls a choice of a signal encoding.

65. The method of claim 64, in which
the other waveform shaping parameter communicates one or a combination of a data rate, a mode, attributes of a calibration pulse, a rise time, a fall time, a pulse width, and a preamble.

66. The method of claim 62, in which
the other waveform shaping parameter represents an other protocol parameter for an RFID system according to a communications protocol.

67. The method of claim 66, in which
the other protocol parameter includes a command for a tag to change its state machine.

68. The method of claim 66, in which
the other protocol parameter includes a command for a tag to respond in a certain manner according to the protocol.

69. The method of claim 62, in which
the other waveform shaping parameter includes an interpreted Q parameter suitable for controlling how an RFID tag generates a random number during an inventorying session, and
the own waveform shaping parameter encodes a transmitted Q parameter whose value is determined from a value of the interpreted Q parameter.

70. The method of 69 in which
the value of the transmitted Q parameter is the equal to that of the interpreted Q parameter.

71. The method of 69 in which
the other waveform shaping parameter does not include a corresponding ACK command, and
the transmitted Q parameter has value of zero.

* * * * *

UNITED STATES PATENT AND TRADEMARK OFFICE
CERTIFICATE OF CORRECTION

PATENT NO. : 7,436,308 B2  Page 1 of 1
APPLICATION NO. : 11/412192
DATED : October 14, 2008
INVENTOR(S) : Sundstrom et al.

It is certified that error appears in the above-identified patent and that said Letters Patent is hereby corrected as shown below:

On Page 2, item (56) under "Other Publications", in column 2, line 9, delete "Reponse" and insert -- Response --, therefor.

On Page 2, item (56) under "Other Publications", in column 2, line 29, delete "measurements" and insert -- measurement --, therefor.

In column 23, line 49, in Claim 7, after "combination" delete ":".

In column 24, line 31, in Claim 19, delete "18" and insert -- claim 18, --, therefor.

In column 24, line 34, in Claim 20, delete "18" and insert -- claim 18, --, therefor.

In column 26, line 6, in Claim 38, after "combination" delete ":".

In column 27, line 30, in Claim 58, after "combination" delete ":".

In column 28, line 35, in Claim 70, delete "69" and insert -- claim 69, --, therefor.

In column 28, line 38, in Claim 71, delete "69" and insert -- claim 69, --, therefor.

Signed and Sealed this

Twenty-third Day of December, 2008

JON W. DUDAS
*Director of the United States Patent and Trademark Office*